US011145296B1

(12) United States Patent
Gandhe et al.

(10) Patent No.: US 11,145,296 B1
(45) Date of Patent: Oct. 12, 2021

(54) LANGUAGE AND GRAMMAR MODEL ADAPTATION

(71) Applicant: Amazon Technologies, Inc., Seattle, WA (US)

(72) Inventors: Ankur Gandhe, Bothell, WA (US); Ariya Rastrow, Seattle, WA (US); Gautam Tiwari, Santa Clara, CA (US); Ashish Vishwanath Shenoy, Seattle, WA (US); Chun Chen, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 16/363,821

(22) Filed: Mar. 25, 2019

(51) Int. Cl.
*G10L 15/193* (2013.01)
*G10L 15/19* (2013.01)
*G10L 15/197* (2013.01)
*G10L 15/22* (2006.01)
*G10L 15/30* (2013.01)

(52) U.S. Cl.
CPC ............ *G10L 15/193* (2013.01); *G10L 15/22* (2013.01); *G10L 15/30* (2013.01); *G10L 2015/223* (2013.01)

(58) Field of Classification Search
CPC ..... G10L 15/183; G10L 15/187; G10L 15/19; G10L 15/193; G10L 15/197; G10L 2015/0635
USPC ...... 704/1, 9, 10, 242, 244, 256.3, 257, 240, 704/250
See application file for complete search history.

(56) References Cited

U.S. PATENT DOCUMENTS

| | | | | |
|---|---|---|---|---|
| 5,625,554 A * | 4/1997 | Cutting | ............... | G06F 16/3334 |
| 6,816,830 B1 * | 11/2004 | Kempe | .................. | G06F 40/216 704/9 |
| 8,972,243 B1 * | 3/2015 | Strom | .................. | G10L 15/193 704/9 |
| 9,336,772 B1 * | 5/2016 | Salvador | ............... | G10L 15/183 |
| 9,792,086 B2 * | 10/2017 | Johnston | ............... | G10L 15/197 |
| 9,865,254 B1 * | 1/2018 | Filimonov | .......... | G10L 15/1822 |
| 9,934,777 B1 * | 4/2018 | Joseph | .................. | G10L 15/063 |
| 9,966,066 B1 * | 5/2018 | Corfield | ............... | G10L 15/193 |
| 10,013,974 B1 * | 7/2018 | Filimonov | ............ | G10L 15/063 |
| 10,109,273 B1 * | 10/2018 | Rajasekaram | ........ | G10L 15/183 |
| 10,121,467 B1 * | 11/2018 | Gandhe | .................. | G10L 15/197 |
| 10,140,981 B1 * | 11/2018 | Filimonov | ............ | G10L 15/183 |
| 10,381,000 B1 * | 8/2019 | Filimonov | .......... | G10L 15/1815 |
| 10,878,806 B1 * | 12/2020 | Li | .......................... | G10L 15/197 |
| 10,964,312 B2 * | 3/2021 | Barton | .................. | G10L 15/183 |
| 2004/0199376 A1 * | 10/2004 | Huttenhower | ........ | G06F 40/268 704/5 |
| 2010/0121642 A1 * | 5/2010 | Hori | ....................... | G06F 16/685 704/254 |
| 2010/0332231 A1 * | 12/2010 | Nakano | .................. | G10L 15/063 704/254 |
| 2011/0082696 A1 * | 4/2011 | Johnston | ............... | G10L 15/197 704/243 |

(Continued)

*Primary Examiner* — Martin Lerner
(74) *Attorney, Agent, or Firm* — Pierce Atwood LLP

(57) ABSTRACT

Systems and methods described herein relate to adapting a language model for automatic speech recognition (ASR) for a new set of words. Instead of retraining the ASR models, language models and grammar models, the system only modifies one grammar model and ensures its compatibility with the existing models in the ASR system.

20 Claims, 19 Drawing Sheets

(56) References Cited

U.S. PATENT DOCUMENTS

| | | | |
|---|---|---|---|
| 2012/0041753 A1* | 2/2012 | Dymetman | G06F 40/289 704/4 |
| 2012/0046939 A1* | 2/2012 | Mohri | G10L 15/193 704/9 |
| 2015/0348547 A1* | 12/2015 | Paulik | G10L 15/197 704/251 |
| 2018/0374484 A1* | 12/2018 | Huang | G10L 15/197 |

* cited by examiner

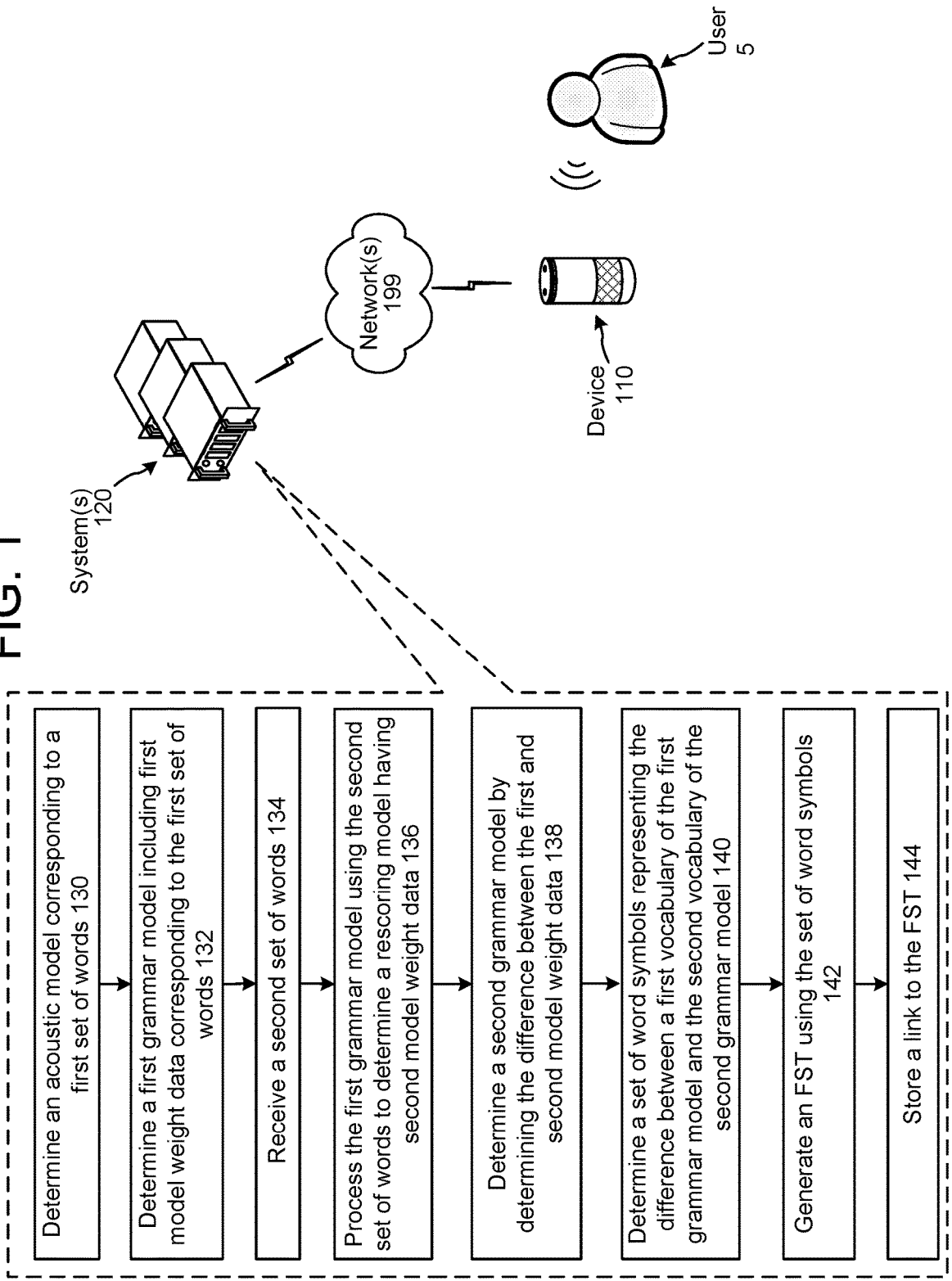

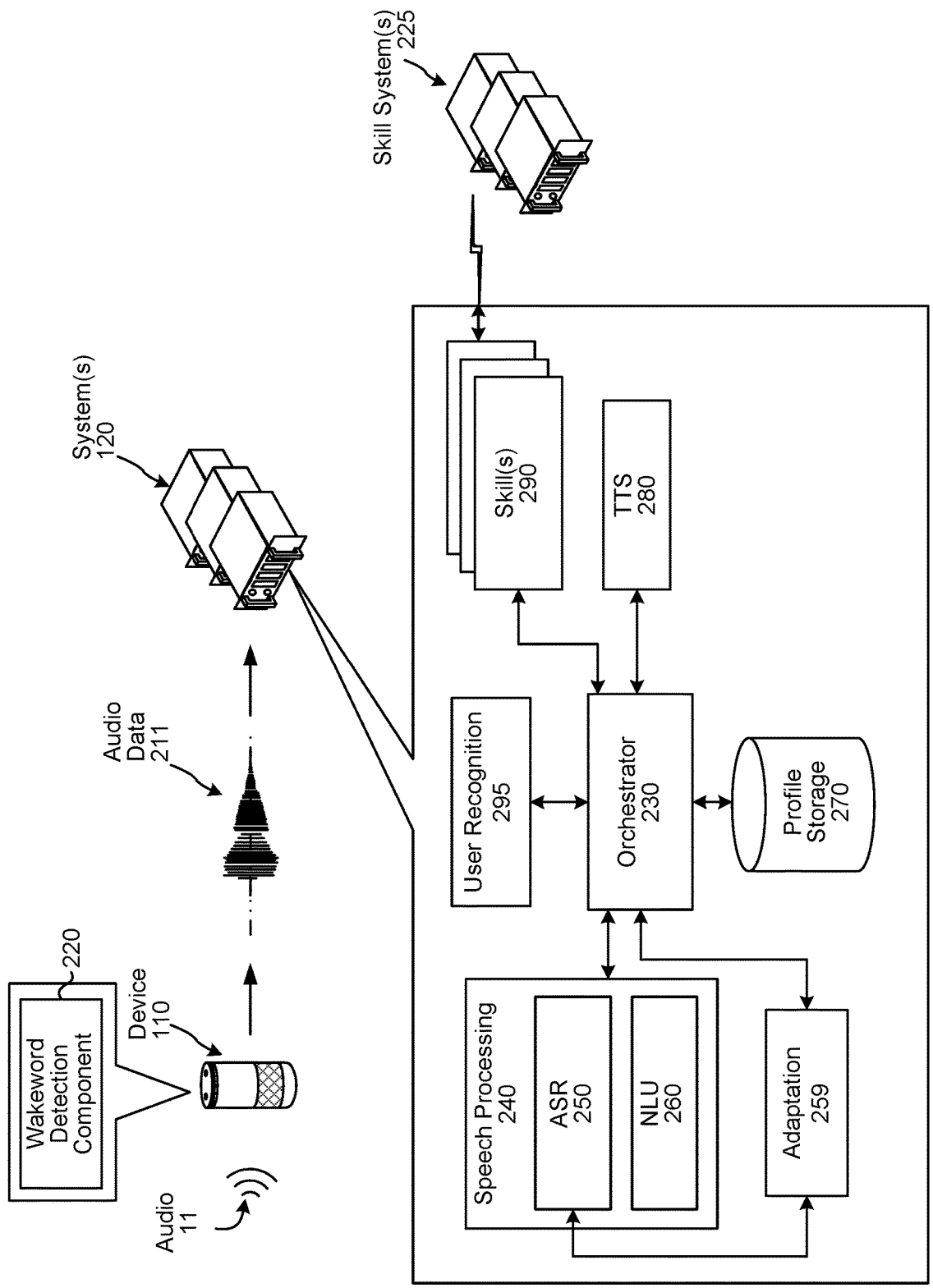

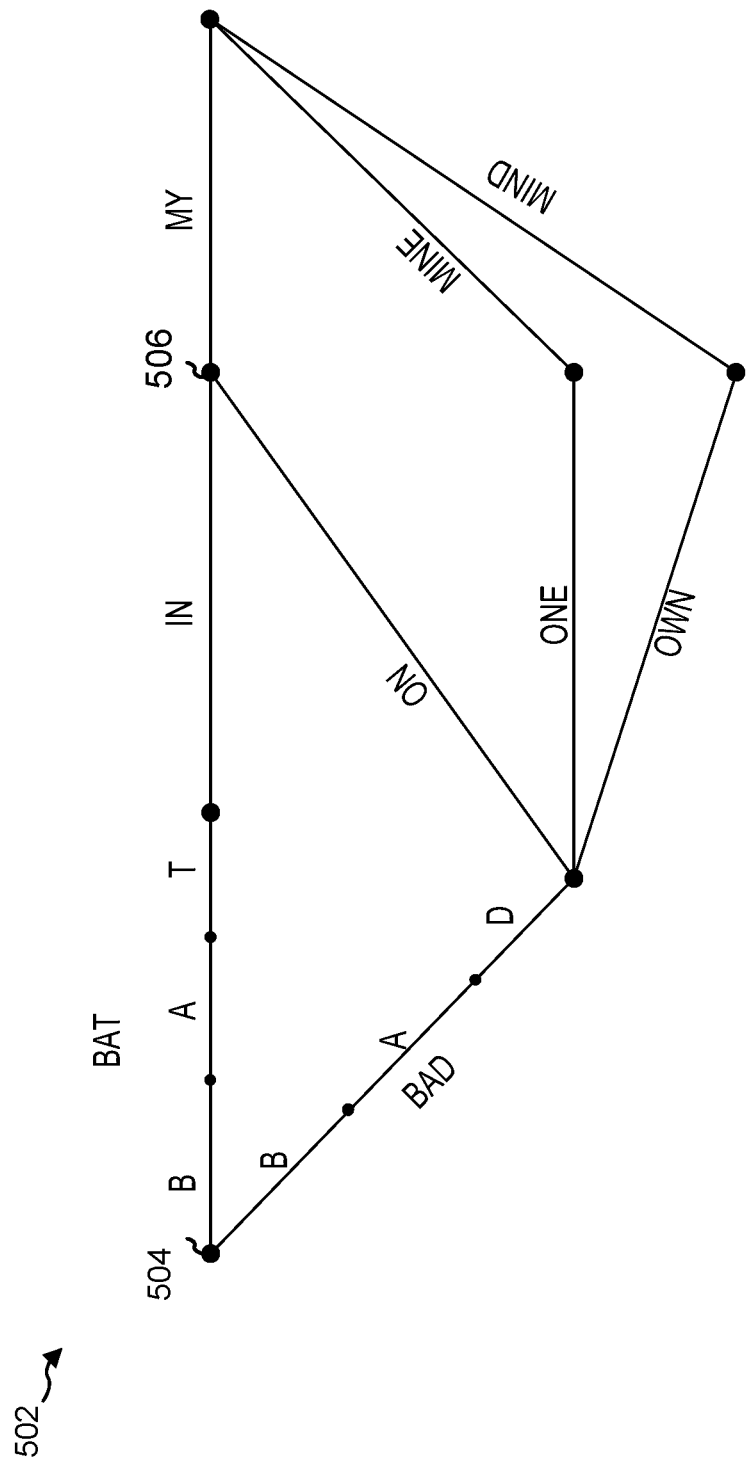

FIG. 7
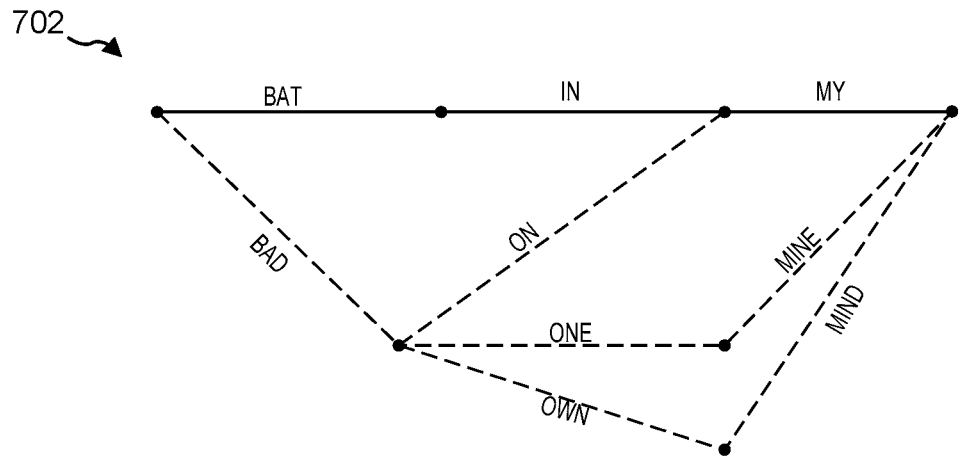
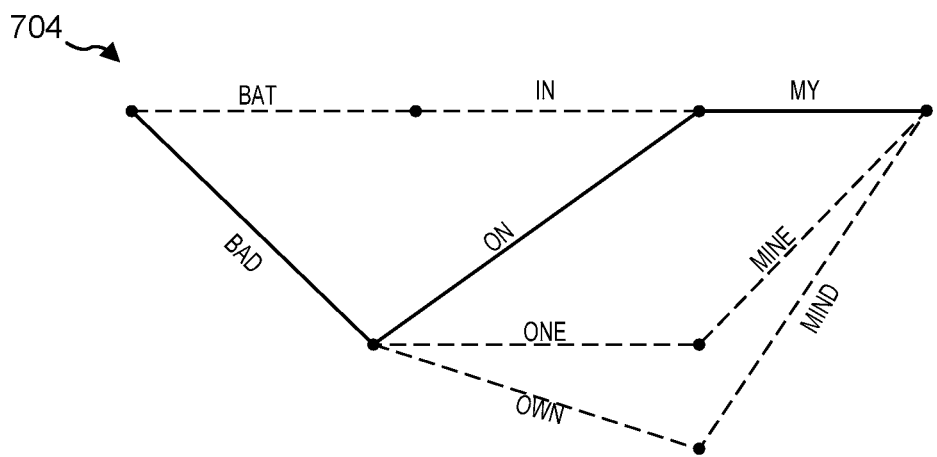
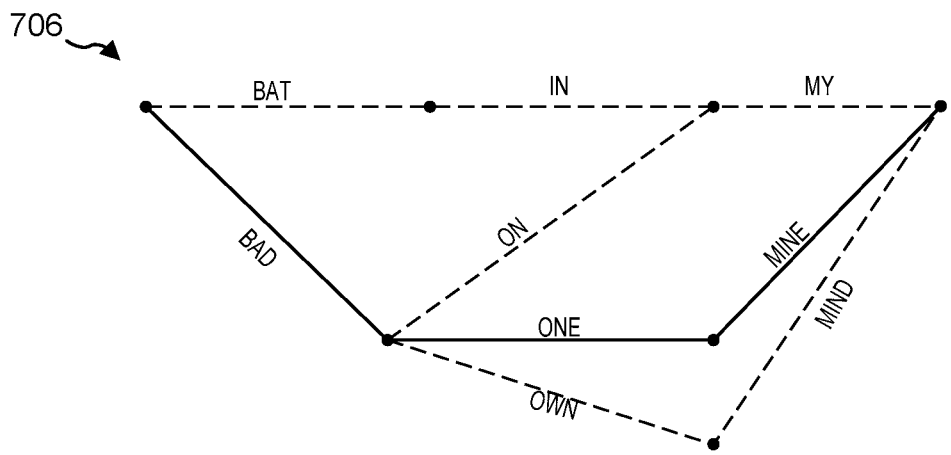

LANGUAGE AND GRAMMAR MODEL ADAPTATION

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to adapt a speech processing system to identify new words by modifying a component of the system according to embodiments of the present disclosure.

FIG. 2A is a conceptual diagram of speech processing components of a system according to embodiments of the present disclosure.

FIG. 5 illustrates a word lattice according to embodiments of the present disclosure.

FIG. 7 illustrates different ways of traversing the lattice of FIG. 5 according to embodiments of the present disclosure.

DETAILED DESCRIPTION

Figure 2B:
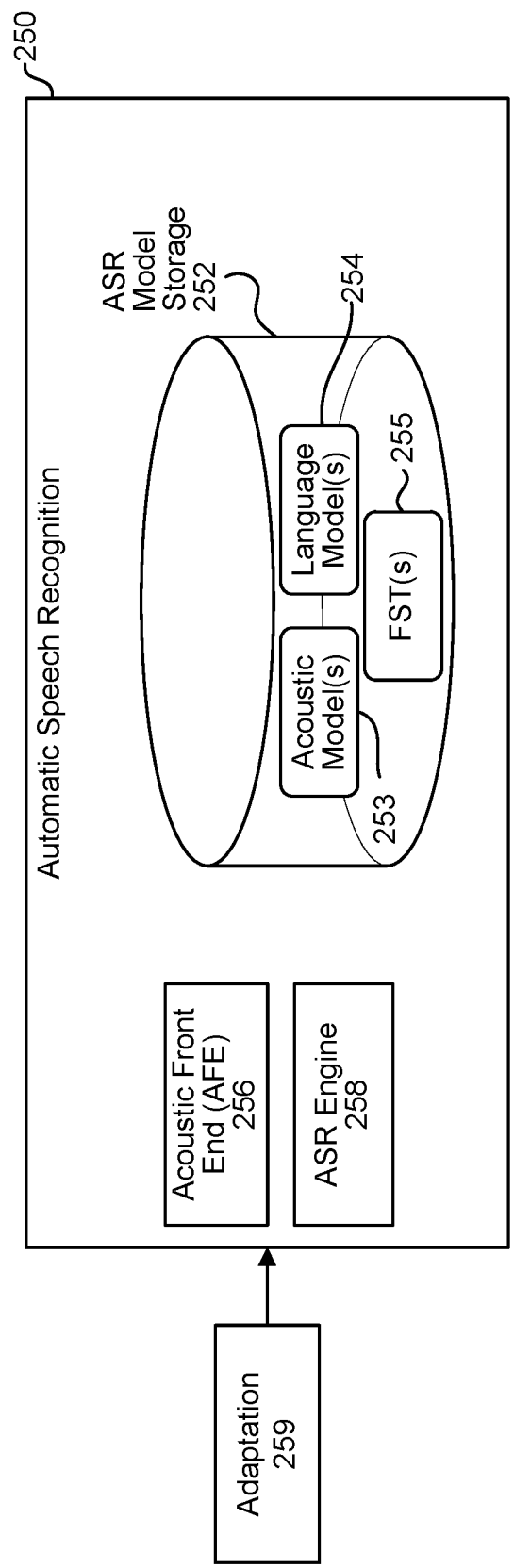
FIG. 2B is a conceptual diagram of automatic speech recognition (ASR) components of the system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, though in certain systems speech processing may include only one of ASR or NLU (or another speech processing technique).

ASR and NLU can be computationally expensive. That is, significant computing resources may be needed to process ASR and NLU processing within a reasonable time frame. Because of this, a distributed computing environment may be used when performing speech processing. An example of such a distributed environment may involve a local client device (e.g., a device in a same environment as a user and capable of capturing spoken commands from the user) having one or more microphones being configured to capture sounds from a user speaking (e.g., "utterances") and convert those sounds into data (e.g., "an audio signal"). The audio signal/data may then be sent to a downstream remote device for further processing, such as converting the audio signal into an ultimate command. The command may then be executed by a combination of remote and local devices depending on the command itself.

Finite State Transducers (FSTs) can be used in ASR systems to encode different knowledge sources (e.g., models) used during processing audio data. In certain aspects an FST may be used to model incoming sounds to words (e.g., an HCL FST, described below). In certain aspects an FST may be used to model words to sentences (e.g., a G FST, language model or grammar model described below). In certain aspects an FST may be used to model incoming sounds to sentences (e.g., an HCLG FST, described below). A language model, which may also be referred to as a grammar model, is a model that indicates how likely certain words are used together, as based on many different example sentences and text available to the system. Such grammar models may encode a representation of how likely such words or word combinations are to be used by a speaker, thus assisting an ASR system in determining the likelihood that a certain word was spoken during an utterance that is being processed. Such grammar models are used with acoustic models to transform audio data into text. Acoustic models are used to determine a likelihood that a certain detected sound corresponds to a particular acoustic unit.

Certain speech recognition systems are configured to only recognize words in a fixed finite vocabulary (in-vocabulary words). Out-of-vocabulary (OOV) words are unknown words that are not in the vocabulary recognized by the models of the speech recognition system. To adjust a speech recognition system to identify more words or new words, models used by the speech recognition system may have to be retrained on training data that includes the new words along with the original words. For example a system may need to retrain an entire acoustic model, language/grammar model, or other models (such as models discussed below).

Retraining entire models can take hours, and sometimes days depending on, among other things, the scale and processing resources available. Thus certain delays and inefficiencies may be introduced in configuring a system to recognize new words. Given the frequency with which new words are encountered that a system may be adjusted to recognize, such delays and inefficiencies are undesired.

Offered herein, among other things, is a system for configuring an existing ASR system to recognize out-of-vocabulary (OOV) words, thus reducing the need to effectively retrain large models or other portions of the entire ASR system and reducing the time to generate models that are capable of recognizing more words. For example, the systems and methods described herein allow one grammar model to be modified to include OOV words and then adjusted to be compatible with other system components rather than modifying/retraining many more, or larger, models of the ASR system.

The systems and methods described herein may be used to more efficiently configure existing grammar models to recognize additional words that may be specific to a particular domain. The grammar model for the new words (domain-specific words) may be generated and stored, and may be used with a main grammar model to enable the speech recognition system to recognize specific words of interest with respect to a domain. For example, a user may want to interact with a navigation domain or application, and may use certain words specific to the navigation domain (e.g., avoid tolls, fastest route, shortest route, etc.) or may refer to a new address or business that was recently added to a geographic area or may desire music to be played by a new artist. The systems and methods described herein enable the speech recognition system to configure the existing models to recognize such words that may not be included in the existing models vocabulary.

FIG. 1 illustrates a system configured to adapt a speech processing system to identify new words by modifying a component of the system according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1, the system may include a device 110 local to a user 5, and one or more systems 120 connected across one or more networks 199. The system(s) 120 (which may be one or more different physical devices) may be capable of performing traditional speech processing (such as ASR, NLU, query parsing, etc.) as described herein. A single system may be capable of performing all speech processing or multiple systems 120 may combine to perform the speech processing. Further, the system(s) 120 may be configured to execute certain commands, such as answering queries spoken by user 5. In addition, certain speech detection or command execution functions may be performed by device 110. The processes described with respect to FIG. 1 may be performed during offline operations.

As shown in FIG. 1, the system(s) 120 determines (130) an acoustic model corresponding to a first set of words. The system(s) 120 determines (132) a first grammar model including first model weight data and corresponding to the first set of words. The first grammar model may be an existing grammar model used by the speech recognition system. The system(s) 120 receives (134) a second set of words, which represent the out-of-vocabulary (OOV) words. In an example embodiment, the second set of words is different than the first set of words. The first set of words may represent in-vocabulary words that the speech recognition system is configured to recognize, while the second set of words may represent words that the speech recognition system is not configured to recognize. It should be understood that the in-vocabulary words may be referred to herein as a second set of words, while the OOV words may be referred to herein as a first set of words. The system(s) 120 processes (136) the first grammar model using the second set of words that represent the OOV words to determine a rescoring model having second model weight data.

The system(s) 120 determines (138) a second grammar model by determining the difference between the first model weight data of the first grammar model and the second model weight data of the rescoring model. In this manner, the system(s) 120 uses an existing grammar model to process OOV words, and generate a new grammar model (second grammar model) configured to recognize the OOV words. In an example embodiment, the grammar models include data representative of a vocabulary (list of words) that they are configured to recognize.

The system(s) 120 determines (140) a set of words representing the difference in a first vocabulary of the first grammar model and a second vocabulary of the second grammar model. The system(s) 120 generates (142) an FST using the set of words. This FST may represent the OOV words, and may be referred to herein as the OOV FST. In an example embodiment, there may be some overlap in the first set of words (in-vocabulary words) and the second set of words (OOV words), or there may be overlap in the way the grammar models process certain words. By determining the difference in vocabularies of the first grammar model and the second grammar model to generate the OOV FST, the system(s) 120 ensures that the OOV FST is representative of words that are not in the grammar model's existing vocabulary. In an example embodiment, the OOV FST may be generated using the second set of words received at step 134. The model weight data of the OOV FST may be determined using the weight data of the first grammar model and the weight data of the second grammar model. The system(s) 120 stores (144) a link to the OOV FST and may associate the link with the acoustic model and/or the first grammar model.

In an example embodiment, the first grammar model is relabeled with the OOV words. For example, data associated with the first grammar model may be modified or updated to indicate to the speech recognition system that the first grammar model is capable of or configured to recognize certain OOV words. The data associated with the output layer or state of the first grammar model is modified or updated to include the OOV words, so that when the first grammar model processes acoustic model output data that corresponds to an OOV word, the first grammar model will not output an error.

After the second grammar model and the OOV FST are determined, they may be packaged for use with the existing acoustic model and existing first grammar model to recognize the OOV words. The system(s) 120 may receive input audio data representing an utterance. The audio data may be processed using the existing acoustic model to generate acoustic model output data. The acoustic model output data may be processed using the existing first grammar model and the OOV FST to generate first grammar model output data. The first grammar model output data may be processed using the second grammar model (determined during the operations of FIG. 1) to generate one or more scores. The scores may indicate a likelihood of the audio data representing one or more words, where the second grammar model is able to recognize words in the audio data that may be the OOV words. In an example embodiment, to speed up the speech recognition process the acoustic model output data may be stored in a data source or may be cached in a data source.

In an example embodiment, the system(s) 120 may associate a link to one or more additional word lists that are specific to a user profile. The link to the additional word lists is associated with an acoustic model or grammar model corresponding to the particular user profile. The additional word lists may be a list of words that may be spoken, in the past or with certain frequency, by a user corresponding to the particular user profile. The additional word lists may include a list of words that may be frequently used with a particular domain/skill/application that is associated with the particular user profile.

As described below, the acoustic model may be a HCLG FST and the grammar model may be a G FST. In some embodiments, the rescoring model may also be a FST.

The overall system of the present disclosure may operate using various components as illustrated in FIG. 2A. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection may be performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis, for example unit selection, the TTS component 280 matches text data against a database of recorded speech. The TTS component 280 selects matching units of recorded speech and concatenates the units together to form audio data. In another method of synthesis, for example parametric synthesis, the TTS component 280 varies parameters such as frequency, volume, and noise to create audio data including an artificial speech waveform. Parametric synthesis uses a computerized voice generator, for example a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a ASR engine 258. The acoustic front end (AFE) 256 transforms the audio data from the microphone into data for processing by the speech recognition engine. The ASR engine 258 compares the speech recognition data with acoustic models 253, language models 254, FST 255, and/or other data models and information for recognizing the speech conveyed in the audio data. The AFE may reduce noise in the audio data and divide the digitized audio data into frames representing time intervals for which the AFE determines a number of values, for example features, representing the qualities of the audio data, along with a set of those values, for example a feature vector, representing the features/qualities of the audio data within the frame. Audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senone, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
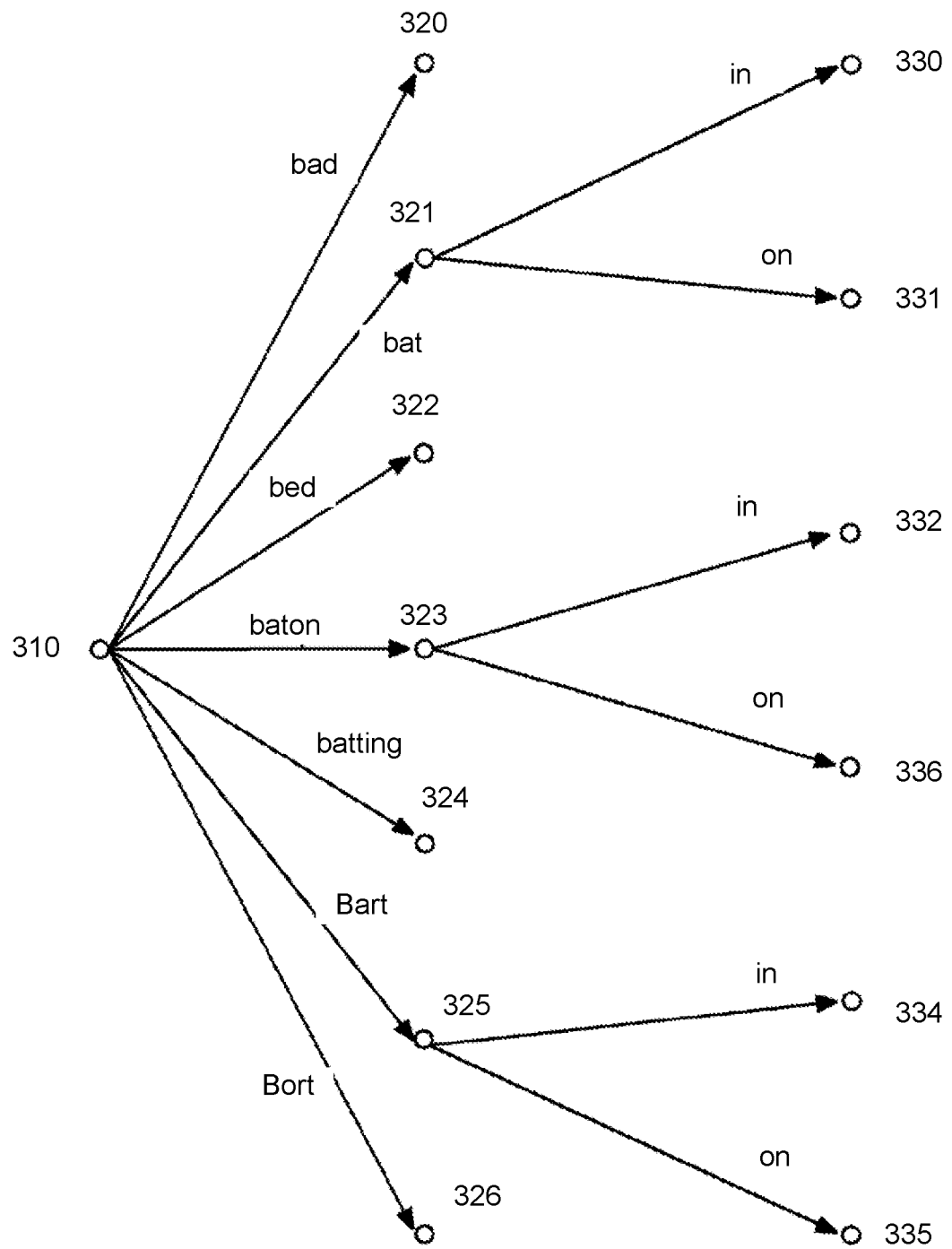
FIG. 3 illustrates a word result network according to embodiments of the present disclosure.

As the ASR engine 258 determines potential words from the input audio, the lattice may become very large as many potential sounds and words are considered as potential matches for the input audio. The potential matches may be illustrated as a word result network representing possible sequences of words that may be recognized and the likelihood of each sequence. In an example embodiment, the lattice or output data of the acoustic model(s) 253 may be stored in a data source or cached for later use, for example, while configuring a grammar model for OOV words. FIG. 3 shows an example of a word result network that may be used by an ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", "batting", "Bart in", "Bart on", and "Bort".

The system(s) 120 may include an adaptation component 259 which may be in communication with automatic speech recognition component 250. The adaptation component 259 is configured to operate various components to enable adaptation of a grammar model to enable the speech recognition component 250 to recognize new words or OOV words. Further details of the adaptation component 259 are described in relation to FIGS. 11 and 12.

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate HMM for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arcs, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the system 120) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

In one aspect of the disclosure, the ASR engine 258 may use a finite state transducer (FST) to perform speech recognition. An FST is a graph that may include all possible words that may be recognized by the ASR engine 258. While the word result network of FIG. 3 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 3. The word result network of FIG. 3 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be created by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phone duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar FST, models individual words to sequences of words that are likely to be used together (referred to as a "G" FST). The grammar model or grammar FST may output grammar data representing a sequence of words likely to be used together, such as lattice illustrated in FIG. 7. Thus, the H FST transduces audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results. A user-customized FST may be created by capturing information about how a user interacts with a voice-controlled system and noting what words are spoken by a user to a device. The system may then customize an FST by weighting more heavily word sequences frequently spoken by a user and/or including user-favored words in an FST that may otherwise not be included. Further, a domain specific language model may be configured based on the words that may be expected for a particular domain.

An FST may be constructed based on a text corpus that includes a large amount of text representing sentences that may be spoken by users. The FST is thus constructed so that it may represent a large number (though not necessarily infinite) number of potential sentences that may be spoken. The FST may be sufficiently granular, however, that each state may represent a particular acoustic unit (such as a senone, phoneme, etc.). Thus, each state of the FST may represent a portion in the progression of potential incoming sounds and how those sounds relate to spoken words. As incoming feature vectors corresponding to audio frames are processed by the ASR engine 258, it may travel from state to state along arcs of the FST. States/arcs that are traversed (and not pruned) are preserved to form a lattice. As each state of the FST is processed by a ASR engine 258, the engine 258 may keep track of the information associated with that portion of the FST (represented by outgoing labels on the arcs between FST states) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a score associated with each arc, and an end state where the arc leads. As feature vectors for audio frames are processed by the ASR engine 258, it may traverse the FST to form a lattice representing potential speech recognition results, where the lattice is made up of nodes and/or arcs of the FST that, after traversal by the ASR engine 258, have satisfied the pruning thresholds to be maintained and not discarded. A lattice may also be formed using the acoustic models and language model described above. In the context of an FST, as the ASR engine 258 traverses through states in the FST, it may assign a score to each state or arc on the FST. After traversing an arc, the score of the arc of the FST may be added to the total cost of the path leading to that arc. To save computational resources, the ASR engine 258 may prune and discard low recognition score states or paths that have little likelihood of corresponding to the spoken utterance, either due to low recognition scores, or for other reasons. Thus, a certain number of states may be preserved for each frame, and those states may be connected to states associated with the next frame (that survived a pruning), thus ultimately resulting in multiple paths through the FST representing potential speech recognition results. These multiple paths may be represented by the lattice, such as the lattice of FIG. 5, discussed below. After traversing the FST, the path with the best score (which may be the highest score or lowest score depending on the configuration of the FST) may be selected as the most likely path.

FIGS. 4A-4D illustrate different a small section of an ASR FST. In particular, FIGS. 4A-4D a small portion of an FST that may be traversed when processing audio data representing speech and determining whether that audio data corresponds to the word "bat" or the word "bad." The FST portion shows a single start state (state 0 shown in FIG. 4A) and multiple end states (states 62, 68, 69, 81, 82, and 83, shown in FIGS. 4C and 4D). In a full FST for speech processing there may be one or multiple start states and many more end states. Further, the end states may be located at various locations throughout the FST to represent different potential end portions that may be received by a potential utterance.

As can be seen in FIGS. 4A-4D, each state has one or more arcs outgoing from it that lead from the particular state to the next state. Each arc is associated with an input label, an output label and a score, shown in the figures as [input label]:[output label]/[score]. Thus, for example, arc 402 outgoing from state 0 to state 2 has an input label of 10, an output label of <eps> (explained below) and a score of 0.15137. The scores illustrated in FIGS. 4A-4D represent scores or "costs" of each arc, where a lower scoring arc represents an arc that is more likely to be traversed/chosen than a higher scoring arc. In the present illustration of FIGS. 4A-4D, the illustrated scores roughly correspond to the negative logarithm of the probability the particular arc may be traversed, but multiple scoring configurations are possible. Further, the scores illustrated in FIGS. 4A-4D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 4A-4D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 4A-4D, the input labels may correspond to individual acoustic speech units such as phonemes or senones or portions thereof. A senone is a grouping of HMM states which represents a particular grouping of phones as may be used together in speech. Each phone may have a number of incrementally different sounds depending on its context (e.g., the surrounding phones). While English may have approximately 50 phones it has several thousand sound groupings represented by senones. Use of senones in ASR processing may allow for improved ASR results. Thus, for example, arc 402 outgoing from state 0 in FIG. 4A has an input label of 10. That may correspond to entry 10 of an input label table, which in turn may correspond to a particular phoneme or portion thereof, for example corresponding to a beginning of a "b" sound as might be spoken in "bat." Further remaining input labels on arcs outgoing from state 0 (4 in arc 404 from state 0 to state 3, 5480 in arc 406 outgoing from state 0 to state 5, 16 in arc 408 outgoing from state 0 to state 1, and 2 in arc 410 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 4A-4D, however, many arcs have a label <eps> (either as input label or as output label) which represents the label epsilon (∈). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 430 from state 10 to state 15 as there is no input label on that arc that refers to an indexed acoustic unit. The ASR engine 258, however, will not traverse arc 432 outgoing from state 15 until a new audio feature vector is processed, as arc 432 has an input label of 5570, which refers to an acoustic unit, thus requiring a new audio feature vector be processed before arc 432 is traversed.

Figure 4A:
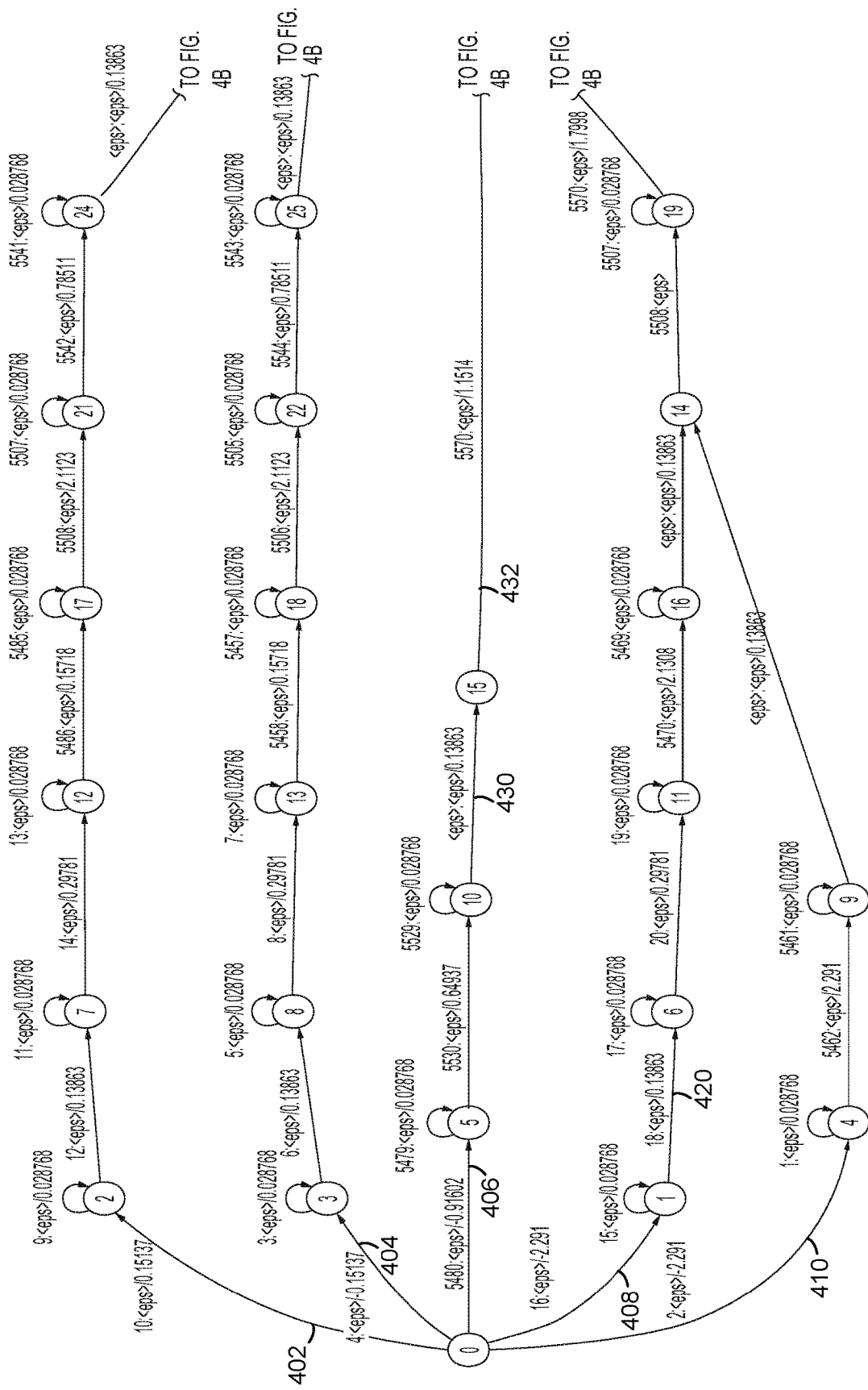
FIGS. 4A-4D illustrate a section of a finite state transducer according to embodiments of the present disclosure.
Figure 4B:
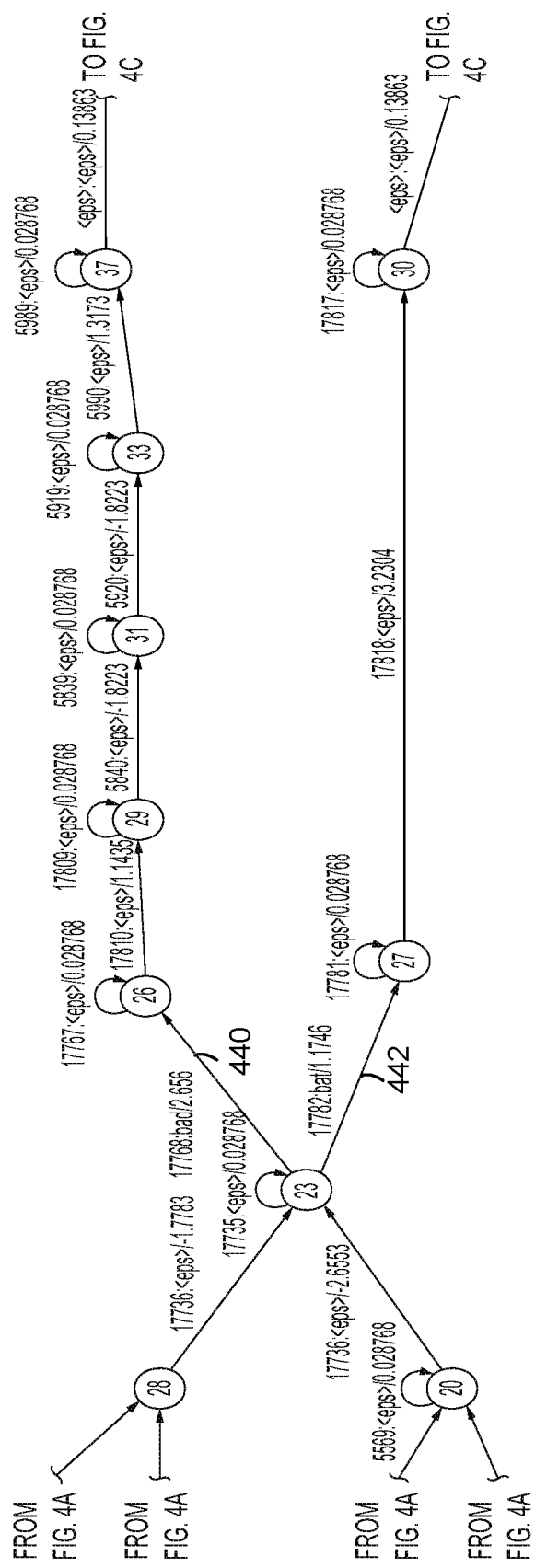
Figure 4C:
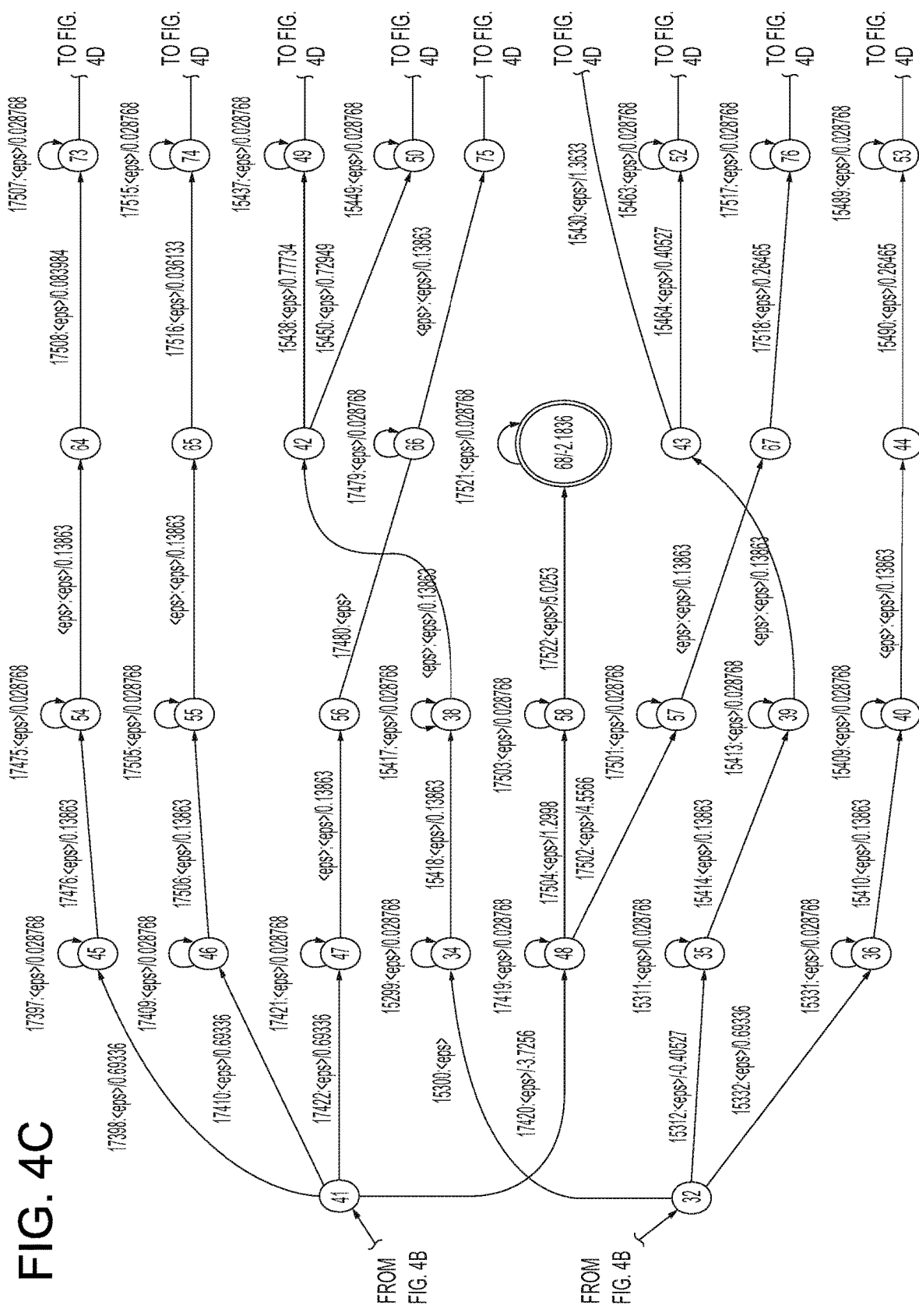
Figure 4D:
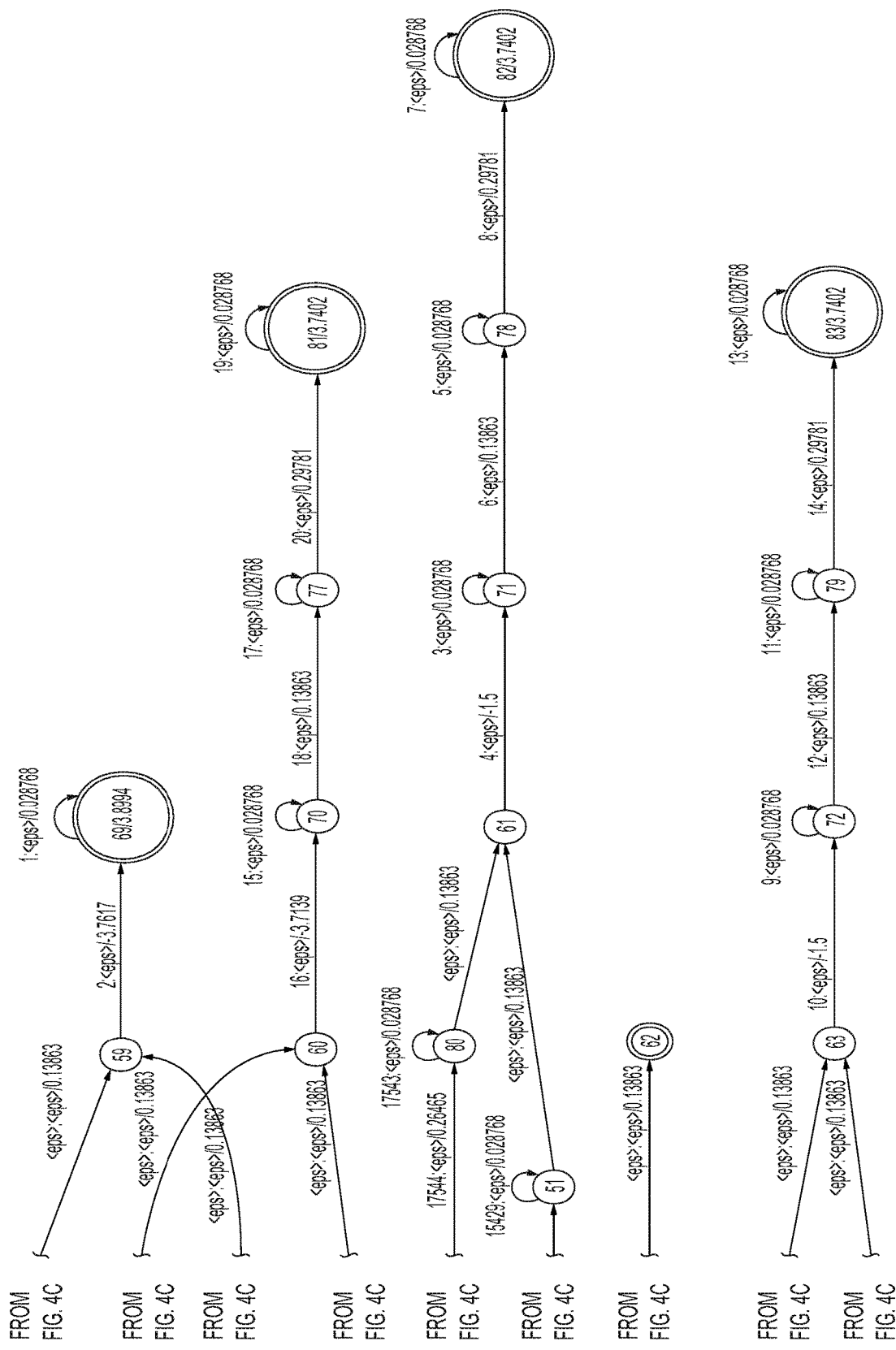

Only certain portions of an FST have an output label. For example, as shown in FIG. 4B, only arcs 440 and 442 have an output label. Arc 440, from state 23 to state 26 has an output label of "bad" and arc 442 from state 23 to state 27 has an output label of "bat." Because the FST portion of FIGS. 4A-4D only illustrate choosing between the words "bad" and "bat", the output labels corresponding to "bad" and "bat" are located at the point in the illustrated FST portion that branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

Although an FST is a graphical construct as shown in FIGS. 4A-4D, when stored as data in the system, an FST may be represented as data in two or more tables. The two tables include a table of states (also referred to as nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:
  (1) Final score of the state,
  (2) Offset in the arc array pointing to the beginning of the list of arcs outgoing from the state,
  (3) Number of outgoing arcs with epsilon (E) input label, and
  (4) Number of outgoing arcs with epsilon (E) output label.
Each of these fields may be represented by a particular N-bit integer (e.g., 16, 32, etc.). The integer size for a particular field may be different from that of a different field.

Thus, to represent a state with many outgoing arcs (for example, state 0 in FIG. 4A) the table entry for state 0 would include a final score of state 0, a pointer to the arc table corresponding to an arc table entry for a first arc outgoing from state 0 (for example 402), a number of outgoing arcs from state 0 with a null epsilon input label and a number of outgoing arcs from state 0 with a null epsilon input label. As FIG. 4A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 420. The system may thus determine that any arcs from 402 up to, but not including 420, are outgoing from state 0.

The arcs table may contain the following information for each arc:

(1) Arc score, (2) Next state ID (the end point of the arc)

(3) Input label (which may be a pointer to a label in a table of input labels)

(4) Output label (which may be a pointer to a label in a table of output labels)

Each of these fields may be represented by a particular N-bit integer. The integer size for a particular field may be different from that of a different field. Thus, to represent a particular arc, for example arc 420, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will rescore the arcs associated with those acoustic units using both the acoustic scores and the scores of the arcs built into the FST.

Take, for example, state 0 of FIG. 4A as an active state being considered as part of ASR processing. An incoming feature vector is received by the system and processed by the ASR engine 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score Si and use it to adjust the existing score (0.84451) of arc 402 (which corresponds to unit 10). The scores may be added together, multiplied, or any other technique of combination. The resulting combined score may then be maintained by the system as the processed score corresponding to arc 402. The same process may be performed for each of the arcs outgoing from state 0 (as each of them have an input label corresponding to an acoustic unit) based on the scores corresponding to the acoustic units of their respective input labels, thus resulting in:

Updated score for 402=0.84451+($s_1$*sf)

Updated score for 404=0.84451+($s_2$*sf)

Updated score for 406=−0.22287+($s_3$*sf)

Updated score for 408=−1.5979+($s_4$*sf)

Updated score for 410=−1.5979+($s_5$*sf)

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, and the combined scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic model which, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the ASR engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 4A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the ASR engine 258 may consider. One such pruning setting is the beam width. The beam width is a measurement of the score difference between a best scoring state (corresponding to the particular audio frame being processed) and the cutoff point.

When the ASR engine 258 has completed processing for a particular feature vector, that is the ASR engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

The number of such states, however, may be very large which may result in significant processing by the ASR engine 258. Thus, the ASR may use a different pruning setting, namely a threshold number of active states. The threshold number of active states indicate the threshold number of states the ASR engine 258 will consider after processing acoustic model data from a first audio frame before it considers acoustic model data from a next audio frame. That is, if a threshold number of active states is 1000, and after processing data for a first audio frame, the engine 258 is considering 1,250 states corresponding to the first audio frame, the ASR engine will discard 250 states before beginning processing of data corresponding to the next audio frame. The discarded states are the states that have the lowest scores among the remaining active states (even if the discarded states were within the beam width). Thus, the maximum number of states keeps the ASR engine 258 from being overwhelmed as it transitions from frame to frame.

As the ASR engine 258 traverses the FST it may store data corresponding to the states and arcs traversed along with their combined scores. That may include a table of entries, for example tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senone, word, or other speech unit. The token may also include links to more than one previous state (and corresponding scores, arcs, labels, etc.).

As the ASR engine traverses portions of the FST, it may use the table of tokens representing the states and arcs traversed, along with their combined scores, to create a lattice of potential paths representing potential ASR results. A sample lattice is shown in FIG. 5. The lattice 502 shows multiple potential paths of speech recognition results that may have been determined by the ASR engine 258 by traversing an FST or by using different acoustic model/ language model processing. Paths between large nodes represent potential words (for example "bad", "bay", etc.) and paths between smaller nodes represent potential phonemes (for example "B", "A", "T", and "B", "A", "D"). For purposes of illustration, individual phonemes are only shown for the first two words of the lattice. The two paths between node 504 and node 506 represent two potential word choices, "bat in" or "bad on". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a skill component 290 for further processing (such as execution of a command included in the interpreted text). Thus the data preserved by the ASR engine 258 during traversal of the FST may result in a lattice representing the most likely possible ASR results (as the least likely results were discarded during pruning). The mostly likely path of the ASR results, for example the Viterbi path, may be selected as the top scoring result for command execution.

FSTs can constitute the bulk of an ASR model, with HCLG being particularly large, sometimes reaching tens of gigabytes in some models. As noted above, an HCLG functionality may be incorporated into a single FST. In other configurations, HCL functionality may be incorporated in one FST, whereas G functionality (i.e., functionality of a grammar or language model) may be incorporated into a different FST. In such as situation, an HCL FST is traversed using output from an acoustic model (as generally described above) to traverse the HCL FST, with the resulting output being one or more potential words and corresponding scores. When the end of a word is reached the HCL FST is traversed again anew (using further acoustic model output) for the next word. Each word(s) and corresponding score(s) from the HCL FST is then output for the system to use traverse the G FST. The G FST represents the possible word groupings (e.g., sentences) that the system may expect to receive. The G FST (or other form of language model) is constructed based on the universe of example text used by the system when building the language model.

Figure 6:
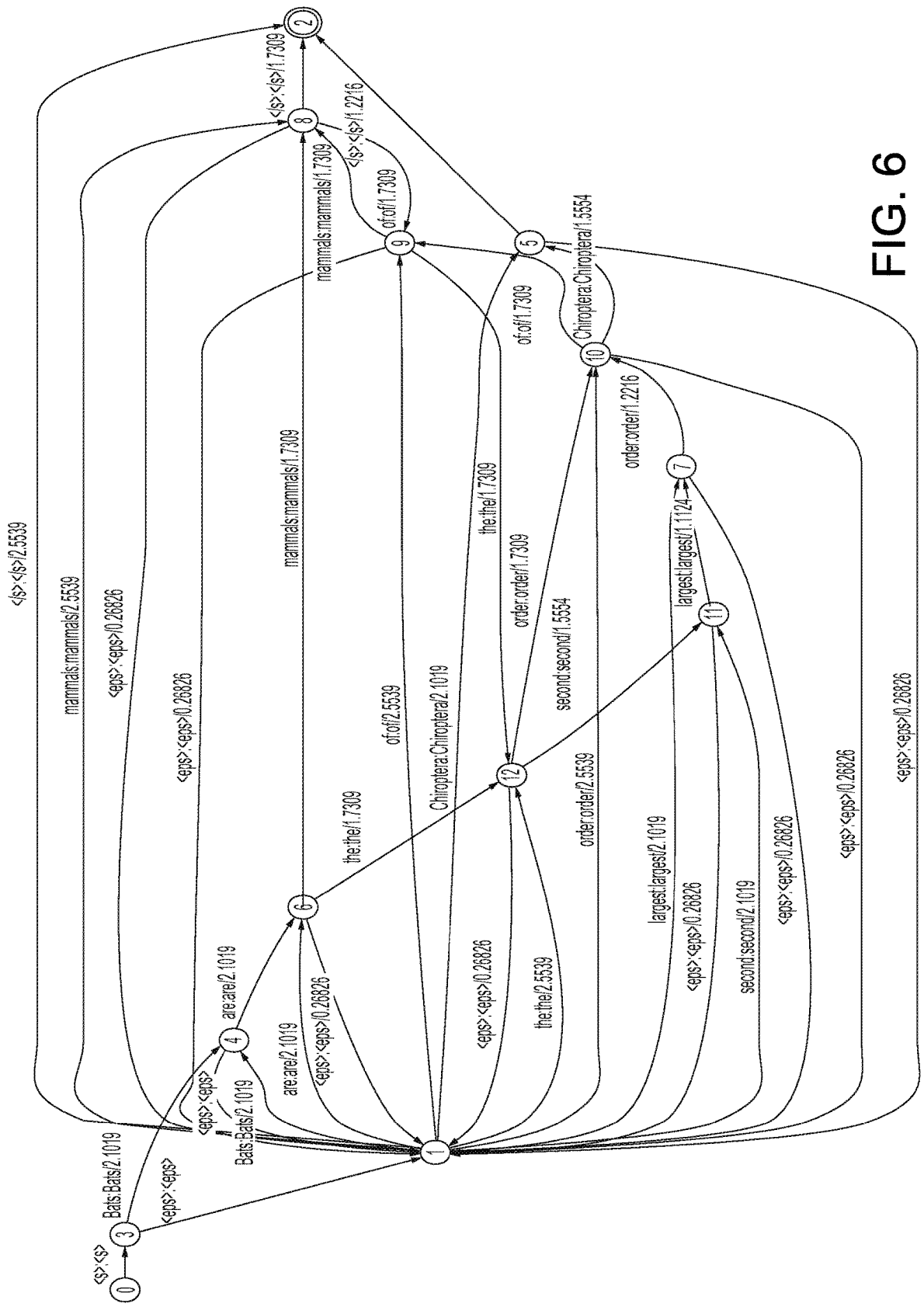
FIG. 6 illustrates a section of a finite state transducer according to embodiments of the present disclosure.

An example of a portion of a G FST is shown in FIG. 6. The FST portion shown in FIG. 6 is a portion of a G FST language model constructed from two sentences, the first being "bats are mammals of the order Chiroptera" and the second being "bats are the second largest order of mammals." The portion of the FST shown in FIG. 6 may normally appear in a much larger FST as part of a general ASR language model, but is shown in FIG. 6 for purposes of illustration. Further, while a complete G FST may be configured to recognize any sequence of the words shown in FIG. 6, the particular illustrated sequences may be more likely due to the construction of the FST (which itself is based on a universe of available text from a text corpus). To traverse the G FST, word outputs from an HCL FST (or other model configured to construct words from sounds output by an acoustic model) are used to determine which arcs to traverse along the G FST. As arcs are traversed, word output labels associated with those arcs are output to form the potential text output that is eventually output as the ASR result. Multiple paths through a G FST may be traversed (with respective scores) thus resulting in an N-best list output of a word string (e.g., a sentence) that potentially represents the input audio data.

Although a G FST may have an arbitrary structure, a language model may have an N-gram model. An N-gram is an ordered sequence of N words. Thus, a size 2 N-gram (for example a bi-gram) includes two words in order for example "I am," "I think," or the like. A size 3 N-gram (for example a trigram) includes three words in order for example "I like to," "I need to," or the like. Certain benefits to representing word groupings as N-grams in a language model FST include their ease of construction, fast computation during runtime decoding of input speech and efficient representation within the FST.

Figure 8:
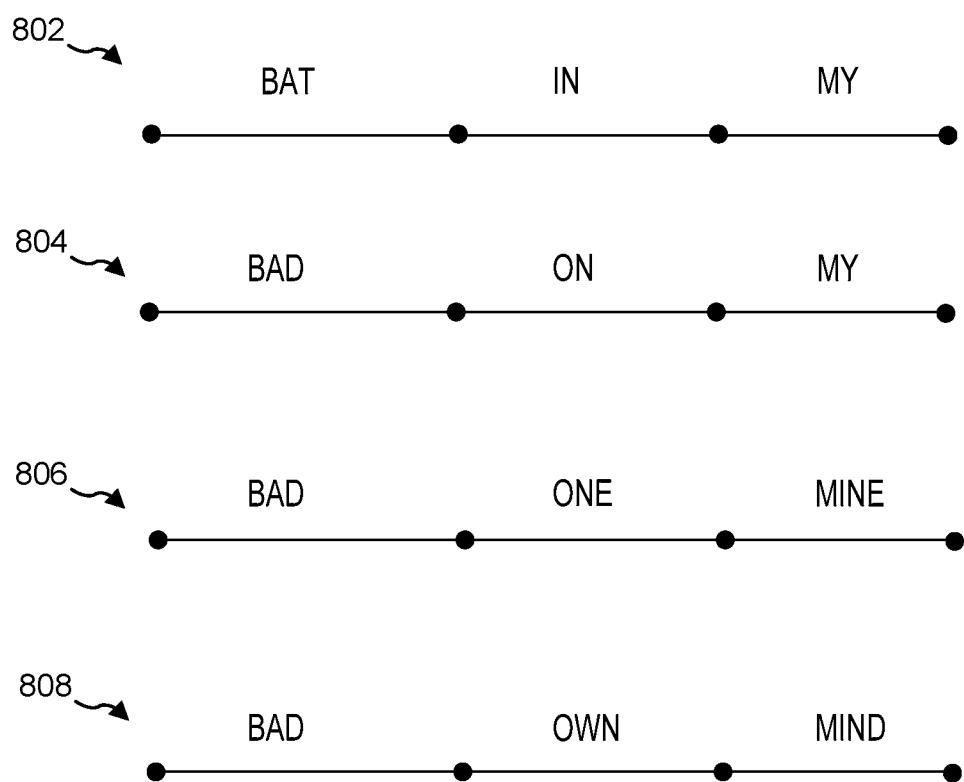
FIG. 8 illustrates an N-best list of hypotheses associated with the lattice of FIG. 5 according to embodiments of the present disclosure

To simplify the illustration of traversing different path results, illustrated in FIG. 7 are different potential paths along the lattice 502. As shown in FIG. 7, path 702 results in "bat in my," path 704 results in "bad on my" and path 706 results in "bad one mine." As can be seen, many such paths are possible even in the small example lattice 502. An example of such paths 802-808 are shown in FIG. 8. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc. As noted above, an ASR component (such as component operating a language model) may output an N-best list, such as the list of potential results shown in FIG. 8, may output a single top scoring answer (e.g., 802) or may output an entire lattice as well as corresponding scores.

In addition to the traditional top sentence of words or N-best result, an ASR component may be configured to output various data calculated by the ASR component during processing. Such data may include, for example, speech units (such as phones), probabilities/scores associated with certain speech units or words, audio frame timing, or the like. A system may be configured to use such data to perform various tasks, for example to confirm the results of ASR processing, which may in turn be used to perform various processing to update a store of facts and information available to a system for query answering.

One such technique, for example, is use of an encoder. Encoding is a general technique for projecting a sequence of features into a vector space. One goal of encoding is to project data points into a multi-dimensional vector space so that various operations can be performed on the vector combinations to determine how they (or the data they contain) related to each other. For example, if usage of two sentences such as "What's the weather today?" and "Is it going to rain today?" are projected into a vector space (where each vector is populated with data points representing how or when the sentences are used), the two sentences would likely end up being close to each other in the vector projection space, thus representing the similar usage of the two sentences. It can be valuable to encode certain features into a vector space to perform various operations.

Figure 9:
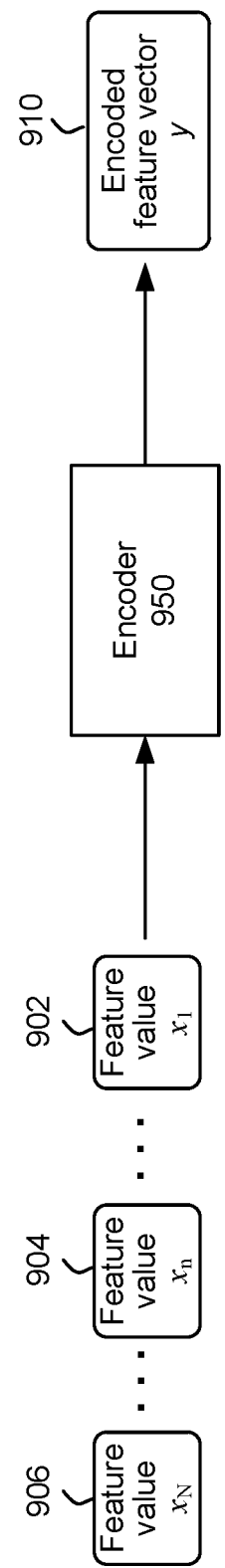
FIG. 9 illustrates operation of an encoder according to embodiments of the present disclosure.

FIG. 9 illustrates feature data values 902-906 being processed by an Encoder 950 to generate an encoded feature vector y. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. Any particular encoder 950 will be configured to output vectors of the same size, thus ensuring a continuity of output encoded vector size from any particular encoder 950 (though different encoders may output vectors of different fixed sizes). The value y may be referred to as an embedding of the sequence $x_1, \ldots x_N$. The length of $x_n$ and y are fixed and known a-priori, but the length of N of feature sequence $x_1, \ldots x_N$ is not necessarily known a-priori. The encoder E may be implemented as a recurrent neural network (RNN), for example as an long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward),
bi-linear, essentially the concatenation of a forward and a backward embedding, or
tree, based on parse-tree of the sequence, In addition, an attention model can be used, which is another RNN or DNN that learns to "attract" attention to certain parts of the input. The attention model can be used in combination with the above methods of consuming the input.

FIG. 9 illustrates operation of the encoder 950. The input feature value sequence, starting with feature value $x_1$ 902, continuing through feature value $x_n$ 904 and concluding with feature value $x_N$ 906 is input into the encoder 950. The encoder 950 may process the input feature values as noted above. The encoder 950 outputs the encoded feature vector y 910, which is a fixed length feature vector of length F. An encoder such as 950 may be used with speech processing as indicated below.

A word sequence is usually represented as a series of one-hot vectors (i.e., a N-sized vector representing the N available words in a lexicon, with one bit high to represent the particular word in the sequence). The one-hot vector is often augmented with information from other models, which have been trained on large amounts of generic data, including but not limited to word embeddings that represent how individual words are used in a text corpus, labels from a tagger (e.g., part-of-speech (POS) or named entity tagger), labels from a parser (e.g., semantic or dependency parser), etc.

Thus components of the system may be configured to use word embeddings in their operations. A word embedding is a representation of a word in the form of a multi-dimensional data vector, where each dimension represents some data point regarding the word, its usage, or other information about the word. To create word embeddings a text corpus is obtained that represents how words are used. The text corpus may include information such as books, news content, internet articles, etc. The system then create multiple vectors, each corresponding to the usage of a particular word (e.g., the usage of the word in the source text corpus), and map those vectors into a vector space. Given the number of dimensions for each vector, the vector space may be a high dimensional vector space. The different dimensions for each data vector may correspond to how a word is used in the source text corpus. Thus the word embedding data represented in the individual values of a word embedding data vector may correspond to how the respective word is used in the corpus.

A number of known techniques for manipulating vectors in high dimensional (or other) vector space may be used to analyze vectors and compare vectors to each other. One example for representing and analyzing word usage characteristic as vectors with word embedding data is the GloVe: Global Vectors for Word Representation project by Jeffery Pennington, Richard Socher, and Christopher D. Manning of the Computer Science Department of Stanford University published in 2014. Other word embedding techniques and/or formats may be used. Further, vectors are one example of tracking and comparing word usage characteristics, other techniques may be used.

Figure 10:
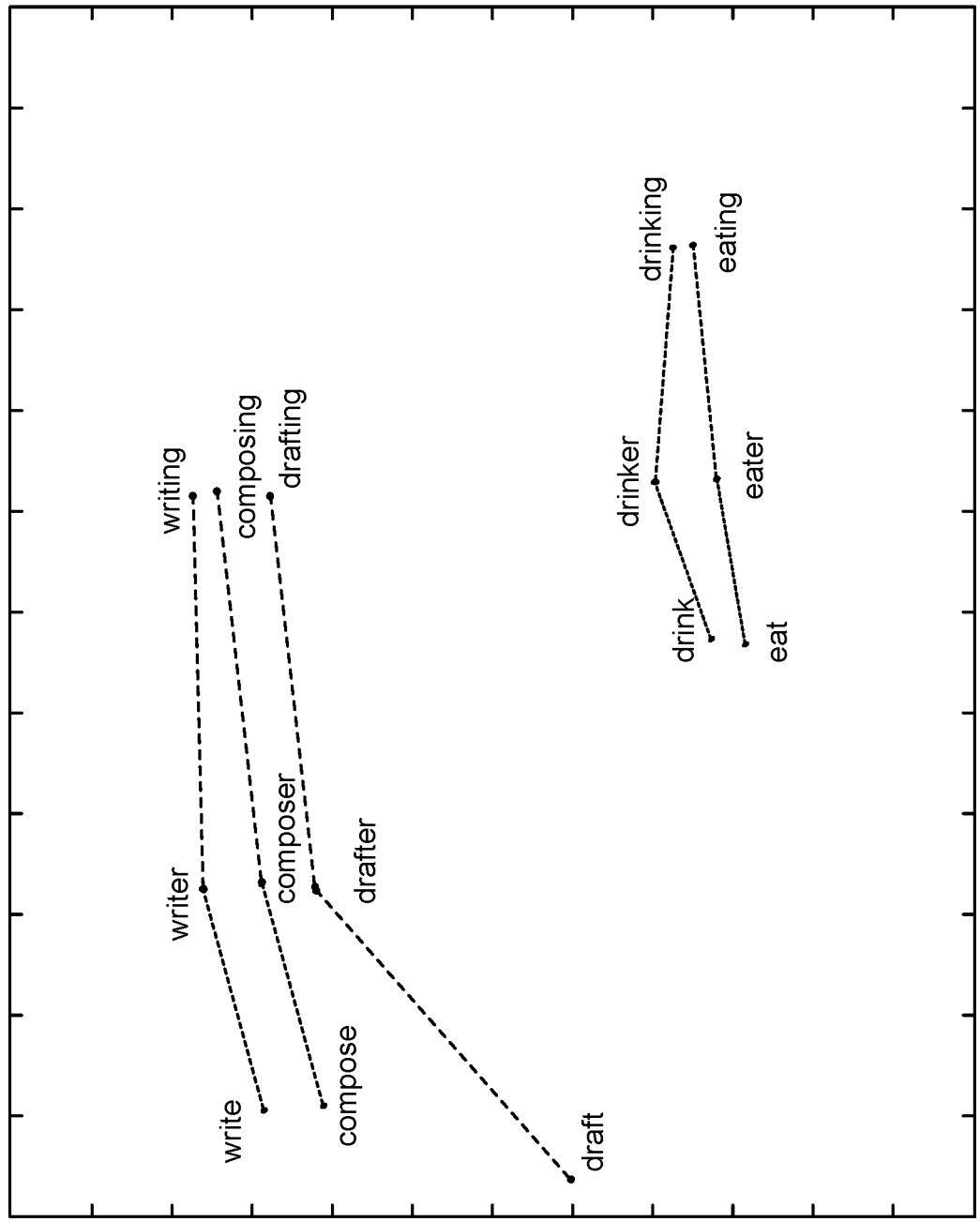
FIG. 10 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent semantic relationships between words as geometric relationship between vectors. For example, FIG. 10 illustrates a number of words in a hypothetical vector space where each point represents the vector location for the particular word. Although illustrated as located in a two-dimensional graph for discussion purposes, the usage vectors for the words illustrated in FIG. 10 would be in a high dimensional space. Further, FIG. 10 is shown for example purposes only and the vector locations/relationships do not necessarily reflect a true graphing of the usage of the illustrated words.

As illustrated in FIG. 10, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 10. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Creating word embeddings may be an intensive process and thus a pre-trained word embedding system may be used for multiple NLU processes. One such word embedding format is GloVe, mentioned above. Others include word2vec described in Distributed Representations of Words and Phrases and their Compositionality by Tomas Mikolov, Kai Chen, Greg Corrado, and Jeffrey Dean, published in 2013, fasttext described in Enriching Word Vectors with Subword Information by Piotr Bojanowski, Edouard Grave, Armand Joulin, and Tomas Mikolov in 2016, and others.

Figure 11:
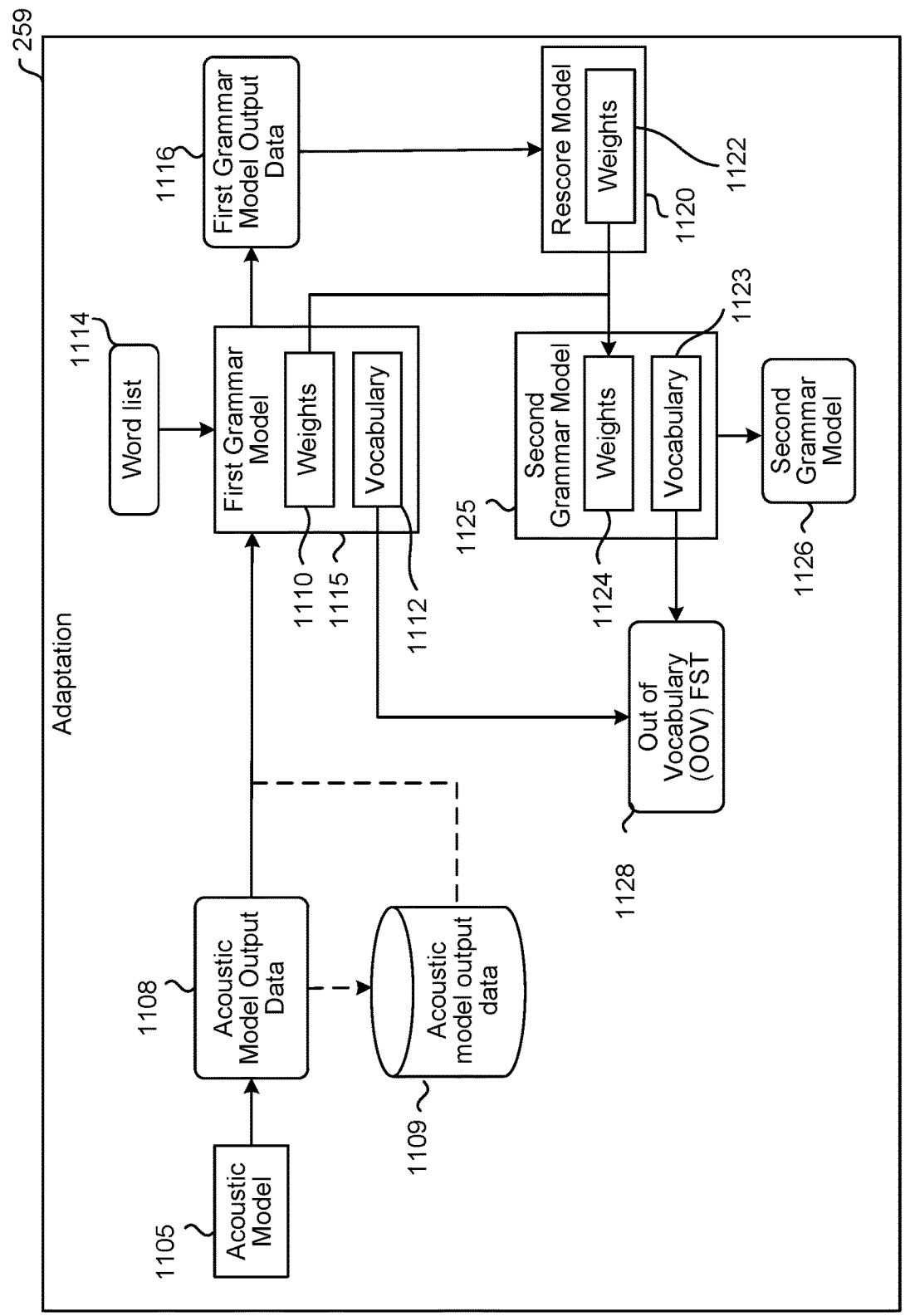
FIG. 11 conceptually illustrates an adaptation component for adapting the speech processing system to identify new words according to embodiments of the present disclosure.

FIG. 11 conceptually illustrates an adaptation component 259 for configuring the speech processing system to identify new words according to embodiments of the present disclosure. The adaptation component 259 may include an acoustic model component 1105 configured to execute or call the acoustic model(s) 253. The adaptation component 259 may also include a first grammar model component 1115 configured to execute or call a grammar model that may be the G FST 255 or language model 254.

The acoustic model component 1105 may process the acoustic model(s) 253 to generate acoustic model output data 1108. In an example embodiment, the acoustic model output data 1108 may be stored in data source 1109. The adaptation component 259 is configured to adapt a second grammar model to recognize OOV words while using existing acoustic model(s) 253. Since, the acoustic model output data 1108 does not change unless the acoustic model(s) 253 is modified, during adaptation of new vocabulary words, the acoustic model output data 1108 may be retrieved from storage 1109 rather than executing the acoustic model 1105.

The first grammar model component 1115 may process a grammar model (e.g., first grammar model or first G FST) using the acoustic model output data 1108 and a word list 1114 to generate first grammar model output data 1116. Grammar models include reference links/slots that point to certain vocabularies. The first grammar model may include a reference link that is configured to point to the word list 1114. The word list 1114 may include one or more words (e.g., OOV words) that the speech recognition system 240 may not be configured to recognize. The first grammar model component 1115 may also manage and store model weight data 1110 and vocabulary data 1112 corresponding to the grammar model (e.g., existing grammar model 254/FST 255). The vocabulary data may indicate words (in-vocabulary words) that the grammar model is configured to recognize. The first grammar model output data 1116 corresponds to the in-vocabulary words and the OOV words 1114.

The adaptation component 259 may also include a rescore model component 1120. The rescore model component 1120 may manage and store a rescoring model that is determined using the first grammar model output data 1116. The rescore model component 1120 may represent a grammar model that is configured to recognize the original words (in-vocabulary words) the speech recognition system 250 is configured to recognize and the OOV words represented in the word list 1114. The weight data 1122 of the rescoring model may be derived from the first grammar model output data 1116.

The second grammar model component 1125 may manage and store a second grammar model. The second grammar model weight data 1124 may be determined by subtracting the weight data 1110 of the first grammar model from the weight data 1122 of the rescoring model. The second grammar model may include a vocabulary 1123 that it is configured to recognize. The adaptation component 259 determines a third set of words using the difference in the vocabulary 1112 of the first grammar model and the vocabulary 1123 of the second grammar model. The third set of words is used to generate an OOV FST 1128.

Figure 12:
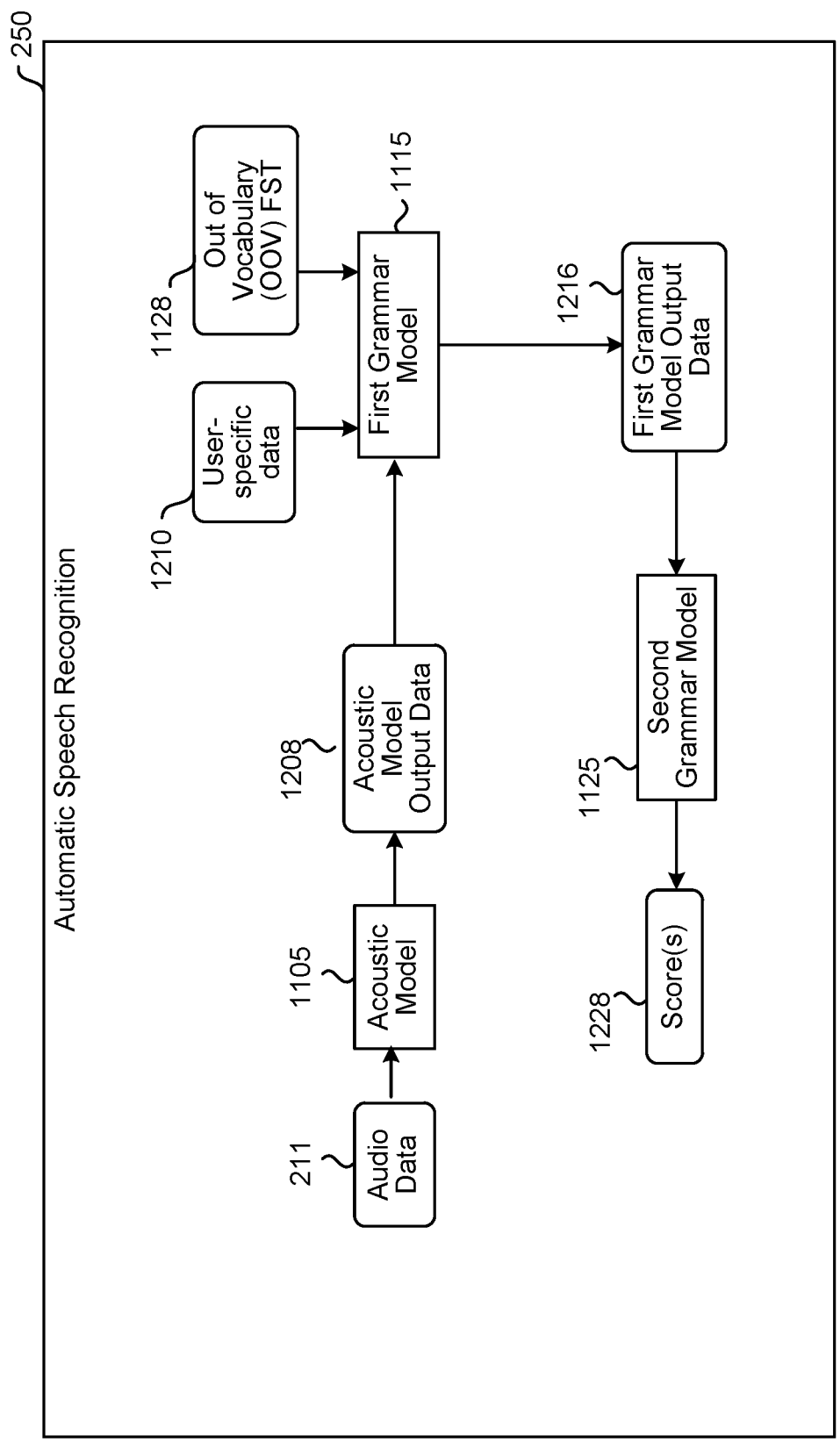
FIG. 12 conceptually illustrates using the adaptation component for processing audio data according to embodiments of the present disclosure.

FIG. 12 conceptually illustrates using the ASR component 250 for processing input audio data 211 according to embodiments of the present disclosure. The audio data 211 may represent an utterance spoken by a user. The acoustic model component 1105 may process the audio data 211 using the existing acoustic model(s) 253 to generate acoustic model output data 1208.

The first grammar model component 1115 processes the acoustic model output data 1208 and the OOV FST 1128 to determine first grammar model output data 1216. In an example embodiment, the first grammar model 1115 also processes user-specific data 1210. The user-specific data 1210 may include data corresponding to a user profile of a user 5 that speaks the speech associated with the audio data 211. The user profile may be determined as described above in relation to user recognition component 295. The user-specific data 1210 may include a list of words derived from data corresponding to the user profile, such as, a contact list associated with the user profile, address/city information associated with the user profile, and the like. A FST may be generated using the user-specific data 1210. In other embodiments, the FST 1128 may be generated using the out-of-vocabulary words and the user-specific data at runtime.

The first grammar model output data 1216 represents output data for the in-vocabulary words and the OOV words. The second grammar model component 1125 processes the first grammar model output data 1216 to determine score(s) 1228. The scores(s) 1228 may indicate the likelihood of the audio data 211 representing one or more words.

In this manner, the systems and methods described herein use existing acoustic and first grammar models, and generate a second grammar model that is configured to recognize the OOV words. A FST for the OOV words is generated, and is linked to the first grammar model for use at runtime.

In an example embodiment, the adaptation component 259 determines a first grammar/language model (a main language model from language model(s) 254) corresponding to a main set of in-vocabulary words and determines a second grammar/language model (a domain language model from language model(s) 254) corresponding to a set of in-vocabulary words specific to a domain. The adaptation component 259 may determine the model weight data of the first grammar model using the model weight data of the main language model and the model weight data of the domain language model. The new/OOV words (e.g., words list 1114) may be derived from the domain language model, and the words may be associated with data representing weights/scores derived from the domain language model. In an example embodiment, the adaptation component 259 may determine the first grammar model 1115 weights by determining how much weight/importance the weights of the main language model should be assigned and how much weight/importance the weights of the domain language model should be assigned.

In another embodiment, the adaptation component 259 determines a feature grammar model corresponding to a small focused vocabulary relating to a particular feature or domain that may be OOV words. The adaptation component 259 generates a G FST using the feature grammar model. The G FST is packaged with the existing acoustic model(s) 253, grammar model(s) 254 and FST(s) 255. Instead of modifying a second grammar model, during runtime the adaptation component 259 may interpolate weight data between the existing grammar model 254 corresponding to a large in-vocabulary word set and the G FST to generate grammar model output data that represents output data corresponding to in-vocabulary words and the OOV words represented by the G FST/feature grammar model.

Figure 13:
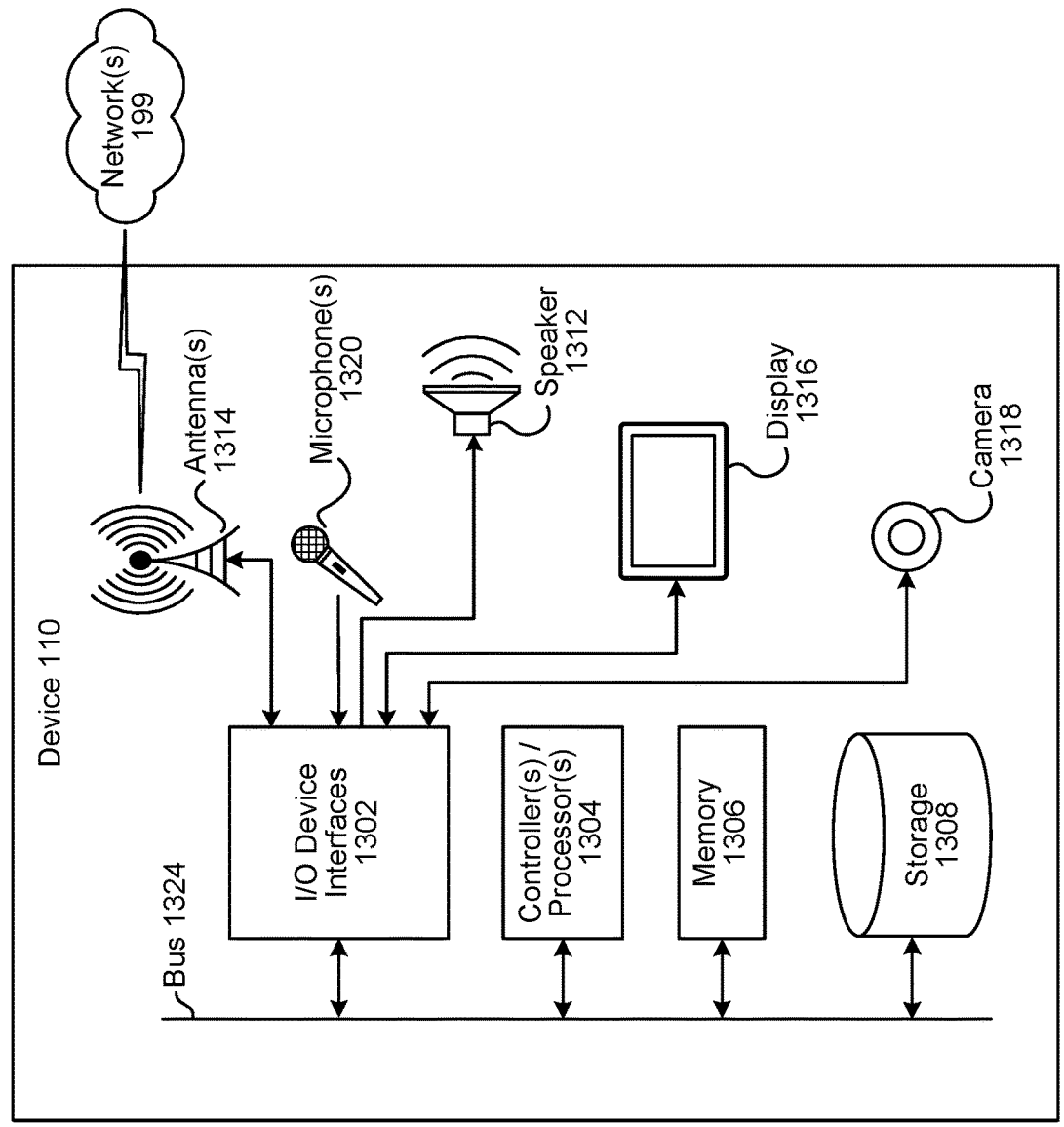
FIG. 13 is a block diagram conceptually illustrating example components of a device according to embodiments of the present disclosure.
Figure 14:
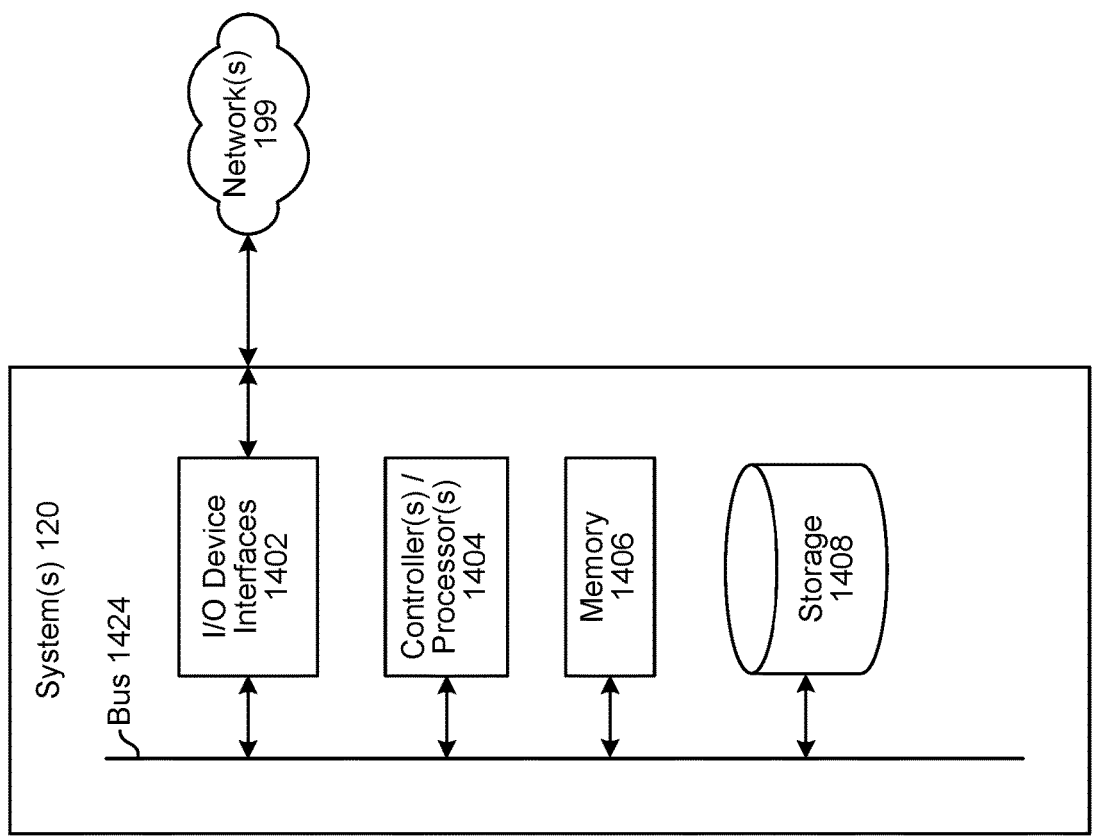
FIG. 14 is a block diagram conceptually illustrating example components of a server according to embodiments of the present disclosure.

FIG. 13 is a block diagram conceptually illustrating a device 110 that may be used with the system. FIG. 14 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/225) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1302/1402).

Computer instructions for operating each device (110/120/225) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/225) includes input/output device interfaces (1302/1402). A variety of components may be connected through the input/output device interfaces (1302/1402), as will be discussed further below. Additionally, each device (110/120/225) may include an address/data bus (1324/1424) for conveying data among components of the respective device. Each component within a device (110/120/225) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones 1320, a wired headset or a wireless headset (not illustrated), etc. If an array of microphones 1320 is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1314, the I/O device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1302/1402) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1302/1402), processor(s) (1304/1404), memory (1306/1406), and/or storage (1308/1408) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 15:
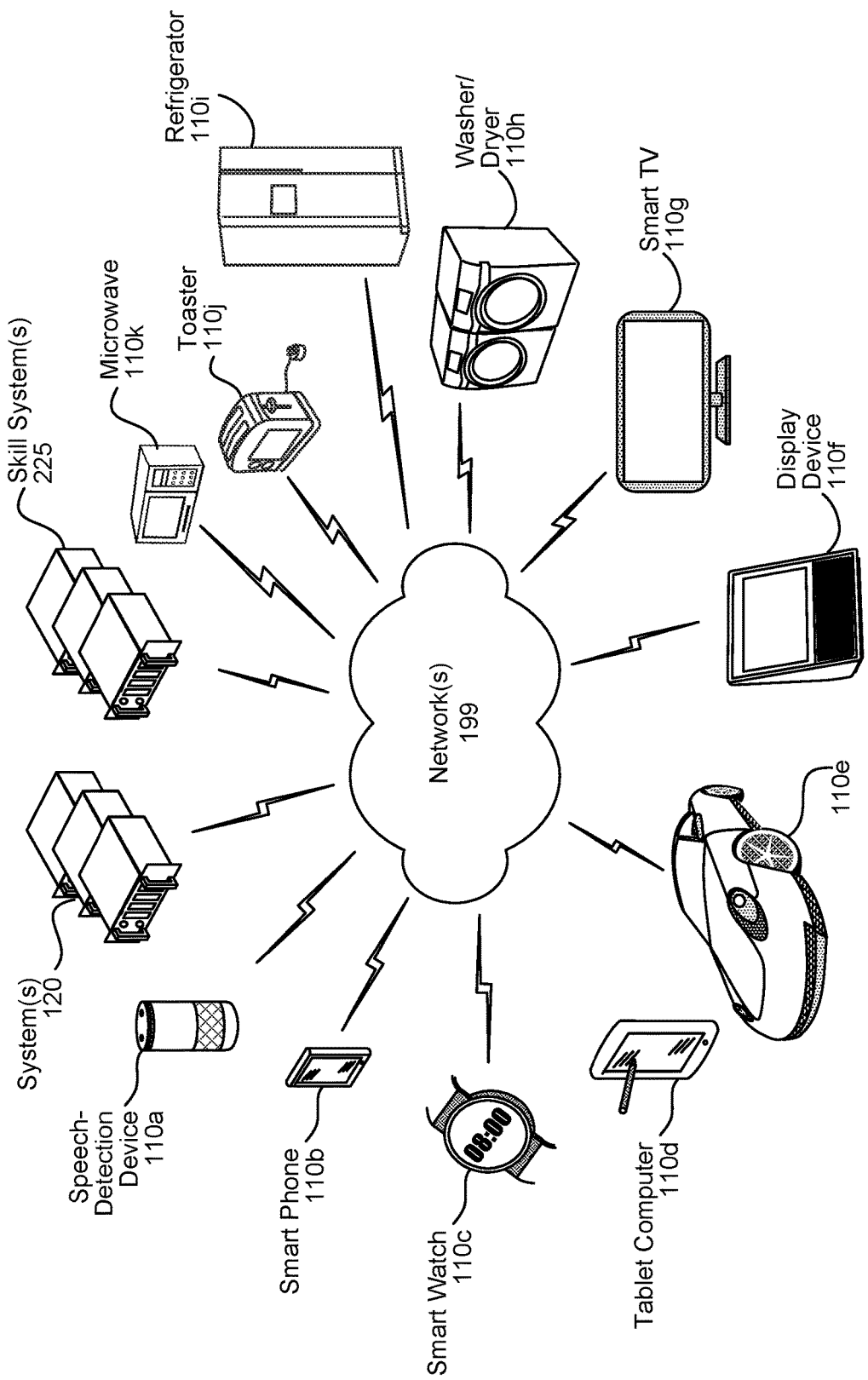
FIG. 15 illustrates an example of a computer network for use with the speech processing system.

As illustrated in FIG. 15, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving input data representing a first set of words;
determining a first grammar model corresponding to a second set of words that are different than the first set of words, the first grammar model including first model weight data;
processing the first grammar model using the input data to determine a rescoring model including second model weight data;
determining a second grammar model based at least in part on a difference between the first model weight data and the second model weight data;
generating a first finite state transducer (FST) corresponding to a third set of words, wherein at least one word of the third set of words is included in the first set of words but not in the second set of words; and
storing a link to the first FST as associated with the first grammar model.

2. The computer-implemented method of claim 1, further comprising:
generating updated data associated with the first grammar model to indicate the link to the first FST.

3. The computer-implemented method of claim 1, further comprising:
determining acoustic model output data representative of an acoustic model corresponding to the second set of words;
processing the acoustic model output data using the first grammar model to determine first grammar model output data, the first grammar model including the link to the first FST; and
processing the first grammar model output data using the second grammar model.

4. The computer-implemented method of claim 1, further comprising:
at a first time period:
determining acoustic model output data representative of an acoustic model corresponding to the second set of words; and
storing the acoustic model output data in a data structure; and
at a second time period after the first time period:
receiving the acoustic model output data from the data structure; and
determining the first model weight data associated with the first grammar model using the acoustic model output data.

5. The computer-implemented method of claim 1, further comprising:
receiving input audio data representing an utterance;
processing the input audio data using an acoustic model to generate first output data;
processing the first output data using the first grammar model to determine second output data, the first grammar model including the link associating the first FST and the second output data representing a likelihood that the input audio data includes a word from the third set of words; and
processing the second output data using the second grammar model to determine at least one score for the input audio data, the at least one score indicating a probability that the input audio data represents a word from the third set of words.

6. The computer-implemented method of claim 1, further comprising:
determining, using the first grammar model and the second grammar model, the third set of words representing a difference between a first vocabulary represented by the first grammar model and a second vocabulary represented by the second grammar model; and
generating the first FST using the third set of words.

7. The computer-implemented method of claim 1, further comprising:
determining third model weight data for the first FST using the first model weight data and fourth model weight data associated with the second grammar model.

8. The computer-implemented method of claim 1, further comprising:
receiving input audio data representing an utterance;
determining user profile data associated with the input audio data;
determining a fourth set of words using the user profile data;
generating a second FST corresponding to the fourth set of words;
storing a second link associating the first grammar model with the second FST;
processing the input audio data using an acoustic model to generate first output data;
processing the first output data using the first grammar model determine second output data, the first grammar model including the link and the second link, and the second output data representing a likelihood that the input audio data includes a word from the third set of words and the fourth set of words; and
processing the second output data using the second grammar model to determine at least one score for the input audio data, the at least one score indicating a probability that the input audio data represents a word from the third set of words and the fourth set of words.

9. The computer-implemented method of claim 1, wherein the first FST comprises at least a portion of a language FST corresponding to a mapping of phonemes to words.

10. The computer-implemented method of claim 1, wherein the first FST comprises at least a portion of a grammar FST corresponding to a plurality of words likely to be used together.

11. A system comprising:
at least one processor; and
at least one memory including instructions that, when executed by the at least one processor, cause the system to:
receive input data representing a first set of words;
determine a first grammar model corresponding to a second set of words that are different than the first set of words, the first grammar model including first model weight data;
process the first grammar model using the input data to determine a rescoring model including second model weight data;
determine a second grammar model based at least in part on a difference between the first model weight data and the second model weight data;
generate a first finite state transducer (FST) corresponding to a third set of words, wherein at least one word of the third set of words is included in the first set of words but not in the second set of words; and store a link to the first FST as associated with the first grammar model.

12. The system of claim 11, wherein the instructions, when executed by the at least one processor, further cause the system to:
generate updated data associated with the first grammar model to indicate the link to the first FST.

13. The system of claim 11, wherein the instructions, when executed by the at least one processor, further cause the system to:
determine acoustic model output data representative of an acoustic model corresponding to the second set of words;
process the acoustic model output data using the first grammar model to determine first grammar model output data, the first grammar model including the link to the first FST; and
process the first grammar model output data using the second grammar model.

14. The system of claim 11, wherein the instructions, when executed by the at least one processor, further cause the system to:
at a first time period:
determine acoustic model output data representative of an acoustic model corresponding to the second set of words; and
store the acoustic model output data in a data structure; and
at a second time period after the first time period:
receive the acoustic model output data from the data structure; and
determine the first model weight data associated with the first grammar model using the acoustic model output data.

15. The system of claim 11, wherein the instructions, when executed by the at least one processor, further cause the system to:
receive input audio data representing an utterance;
process the input audio data using an acoustic model to generate first output data;
process the first output data using the first grammar model to determine second output data, the first grammar model including the link associating the first FST and the second output data representing a likelihood that the input audio data includes a word from the third set of words; and
process the second output data using the second grammar model to determine at least one score for the input audio data, the at least one score indicating a probability that the input audio data represents a word from the third set of words.

16. The system of claim 11, wherein the instructions, when executed by the at least one processor, further cause the system to:
determine, using the first grammar model and the second grammar model, the third set of words representing a difference between a first vocabulary represented by the first grammar model and a second vocabulary represented by the second grammar model; and
generate the first FST using the third set of words.

17. The system of claim 11, wherein the instructions, when executed by the at least one processor, further cause the system to:
determine third model weight data for the first FST using the first model weight data and fourth model weight data associated with the second grammar model.

18. The system of claim 11, wherein the instructions, when executed by the at least one processor, further cause the system to:
receive input audio data representing an utterance;
determine user profile data associated with the input audio data;
determine a fourth set of words using the user profile data;
generate a second FST corresponding to the fourth set of words;
storing a second link associating the first grammar model with the second FST;
process the input audio data using an acoustic model to generate first output data;
process the first output data using the first grammar model to determine second output data, the first grammar model including the link and the second link, and the second output data representing a likelihood that the input audio data includes a word from the third set of words and the fourth set of words; and
process the second output data using the second grammar model to determine at least one score for the input audio data, the at least one score indicating a probability that the input audio data represents a word from the third set of words and the fourth set of words.

19. The system of claim 11, wherein the first FST comprises at least a portion of a language FST corresponding to a mapping of phonemes to words.

20. The system of claim 11, wherein the first FST comprises at least a portion of a grammar FST corresponding to a plurality of words likely to be used together.

* * * * *